US010974830B2

(12) United States Patent
Bosworth et al.

(10) Patent No.: US 10,974,830 B2
(45) Date of Patent: Apr. 13, 2021

(54) MANIPULATION SYSTEM AND METHOD FOR AN AIRCRAFT

(71) Applicant: Aurora Flight Sciences Corporation, Manassas, VA (US)

(72) Inventors: William Bosworth, Cambridge, MA (US); Devin Richard Jensen, Cambridge, MA (US); Jae-Woo Choi, Manassas, VA (US)

(73) Assignee: Auror Flight Scienes Corporation, Manassas, VA (US)

(*) Notice: Subject to any disclaimer, the term of this patent is extended or adjusted under 35 U.S.C. 154(b) by 461 days.

(21) Appl. No.: 15/856,815

(22) Filed: Dec. 28, 2017

(65) Prior Publication Data
US 2019/0202560 A1    Jul. 4, 2019

(51) Int. Cl.
*B64D 1/00*     (2006.01)
*B64C 39/02*    (2006.01)
(Continued)

(52) U.S. Cl.
CPC .............. *B64D 1/00* (2013.01); *B25J 9/1065* (2013.01); *B25J 15/0028* (2013.01); *B25J 15/0213* (2013.01); *B64C 39/024* (2013.01); *B64C 2201/027* (2013.01); *B64C 2201/042* (2013.01); *B64C 2201/108* (2013.01); *B64C 2201/12* (2013.01)

(58) Field of Classification Search
CPC .......... B64D 1/00; B64D 1/12; B64C 39/024; B64C 2201/027; B64C 2201/12; B64C 2201/128

USPC ...................................................... 244/137.4
See application file for complete search history.

(56) References Cited

U.S. PATENT DOCUMENTS 8,882,165 B2    11/2014  Lipson et al.
9,280,038 B1*    3/2016  Pan ........................ F16M 11/12
(Continued)

FOREIGN PATENT DOCUMENTS

CN        105014687 A    11/2015
DE    102015116174 A1     3/2016
(Continued)

OTHER PUBLICATIONS

Extended European search report for Application No. EP 18214229.9, dated Mar. 8, 2019.
(Continued)

*Primary Examiner* — Christopher P Ellis
(74) *Attorney, Agent, or Firm* — Michael Stabley Tomsa; McAndrews, Held & Malloy, Ltd.; Eugene H. Nahm

(57) ABSTRACT

A workpiece manipulation system to provide high-precision manipulation of a workpiece by an aircraft. The workpiece manipulation system comprises a lifting mechanism to couple with the aircraft, an end-effector, and a processor. The lifting mechanism includes one or more joint actuators to extend or retract the lifting mechanism relative to the aircraft. The end-effector includes an end-effector actuator to control an operation of the end-effector to manipulate the workpiece. The processor is communicatively coupled with the aircraft processor and configured to control operation of the end-effector actuator and the one or more joint actuators. In operation, the processor provides feedback to the aircraft.

20 Claims, 12 Drawing Sheets

(51) Int. Cl.
  *B25J 9/10* (2006.01)
  *B25J 15/02* (2006.01)
  *B25J 15/00* (2006.01)

(56) References Cited

U.S. PATENT DOCUMENTS

| | | | |
|---|---|---|---|
| 9,302,770 B2 | 4/2016 | Burgess et al. | |
| 9,387,928 B1 | 7/2016 | Gentry et al. | |
| 9,487,356 B1* | 11/2016 | Aggarwal | B65G 1/0464 |
| 9,718,564 B1* | 8/2017 | Beckman | B61L 23/00 |
| 10,336,543 B1* | 7/2019 | Sills | B64D 1/22 |
| 2003/0066373 A1* | 4/2003 | Maeguchi | B25J 9/1065 74/490.01 |
| 2005/0275367 A1* | 12/2005 | Buehler | B25J 9/102 318/568.12 |
| 2014/0032034 A1 | 1/2014 | Raptopoulos et al. | |
| 2015/0175276 A1 | 6/2015 | Koster et al. | |
| 2016/0068265 A1 | 3/2016 | Hoareau et al. | |
| 2016/0159472 A1* | 6/2016 | Chan | B64C 27/37 244/39 |
| 2016/0189101 A1 | 6/2016 | Kantor et al. | |
| 2016/0236346 A1* | 8/2016 | Lee | B25J 9/0087 |
| 2016/0311545 A1 | 10/2016 | Parks et al. | |
| 2016/0377424 A1* | 12/2016 | Clark | B64C 39/024 356/600 |
| 2017/0066138 A1* | 3/2017 | Hawkes | B25J 15/008 |
| 2017/0233076 A1* | 8/2017 | Grossman | B64F 5/00 244/137.4 |
| 2017/0331323 A1 | 11/2017 | Ehrmantraut | |
| 2018/0079629 A1* | 3/2018 | Abdallah | B25J 13/089 |
| 2018/0284760 A1* | 10/2018 | Gupta | B25J 13/006 |
| 2018/0335372 A1* | 11/2018 | Orol | A01G 3/00 |
| 2018/0337731 A1* | 11/2018 | Taptic | H01Q 13/02 |
| 2018/0354625 A1* | 12/2018 | Verkade | B64C 39/024 |
| 2018/0361595 A1* | 12/2018 | Troy | G01B 11/002 |
| 2019/0043370 A1* | 2/2019 | Mulhall | B64D 1/08 |
| 2019/0069496 A1* | 3/2019 | Wofford | A01G 25/16 |
| 2019/0070772 A1* | 3/2019 | Stone | B29C 70/46 |
| 2019/0077506 A1* | 3/2019 | Shaw | G08G 5/006 |
| 2019/0084670 A1* | 3/2019 | Sharma | B64C 39/024 |
| 2019/0095687 A1* | 3/2019 | Shaw | A61B 5/1128 |
| 2019/0127052 A1* | 5/2019 | Chen | B64C 25/24 |
| 2019/0127064 A1* | 5/2019 | Beardsley | B05B 15/652 |
| 2019/0161190 A1* | 5/2019 | Gil | G06Q 10/083 |
| 2019/0162358 A1* | 5/2019 | Wang | B64D 47/08 |
| 2019/0166765 A1* | 6/2019 | Maor | G05D 1/104 |
| 2019/0275683 A1* | 9/2019 | Bright | B25J 19/007 |
| 2019/0276140 A1* | 9/2019 | Poltorak | B64C 27/04 |
| 2019/0311555 A1* | 10/2019 | Troy | G06K 9/00624 |
| 2019/0314990 A1* | 10/2019 | Sugaki | B25J 5/00 |
| 2019/0321971 A1* | 10/2019 | Bosworth | B25J 9/162 |
| 2019/0348857 A1* | 11/2019 | Dudar | B64C 39/024 |
| 2019/0373173 A1* | 12/2019 | Wang | B64D 47/08 |

FOREIGN PATENT DOCUMENTS

| | | | | |
|---|---|---|---|---|
| EP | 2003057 A2 | 12/2008 | | |
| EP | 2727835 A2 | 5/2014 | | |
| EP | 3505444 A1 * | 7/2019 | | B60L 53/60 |
| EP | 3505445 A1 * | 7/2019 | | B64C 39/024 |
| ES | 2614994 A1 | 6/2017 | | |
| FR | 3036992 A1 | 12/2016 | | |
| JP | 35231456 A | 3/1977 | | |
| WO | 2017/183637 A1 | 10/2017 | | |
| WO | 2017/184327 A1 | 10/2017 | | |
| WO | WO-2017172932 A1 * | 10/2017 | | G09F 21/12 |
| WO | WO-2017178898 A2 * | 10/2017 | | B64F 5/40 |
| WO | WO-2018026285 A1 * | 2/2018 | | B64C 39/024 |

OTHER PUBLICATIONS

Hrovat, D., "Applications of Optimal Control to Advanced Automotive Suspension Design," Journal of Dynamic Systems, Measurement, and Control, vol. 115, ASME, Jun. 1993.

Hrovat, D., "Survey of Advanced Suspension Developments and Related Optimal Control Applications," Automatica, vol. 33, No. 10, 1997.

Intel®, "Intel® RealSense™ Data Ranges: Intel® RealSense™ Camera (SR300), Intel® RealSense™ Camera (R200)," Mar. 1, 2016.

Liu et al., "Precise slow motion control of a direct-drive robot arm with velocity estimation and friction compensation," Mechatronics, vol. 14, 2004.

Pounds et al., "Practical Aerial Grasping of Unstructured Objects," IEEE, 2011.

Communication and examination report for Application No. 18214229.9, dated Jun. 4, 2020, pp. 1-7, European Patent Office, Germany.

\* cited by examiner

MANIPULATION SYSTEM AND METHOD FOR AN AIRCRAFT

TECHNICAL FIELD

This present invention generally relates to aircraft systems, more specifically, to aircraft and aircraft systems capable of high-precision manipulation, transportation, and emplacement of workpieces.

BACKGROUND

Robotic arms have proven to operate accurately around the clock with limited supervision (typically requiring little operator interaction after initial programming). Over the recent decades, robotic automation has evolved to enable highly reliable, millimeter-precision pick-up and placement of workpieces using a robotic arm. While robotic arms have evolved to be highly reliable and efficient, they suffer from a number of shortcomings. For example, robotic arms are also costly, occupy valuable facility real estate, and, because they are limited to either being bolted to the floor or to riding on rails, a single facility often requires that multiple robotic arms be installed next to each other in order to service a continuous production line. In certain industries, precision grasping and emplacement of a workpiece is crucial. For example, wet-lab automation requires the ability to manipulate microplates (e.g., microtiter plates) with millimeter accuracy, which is traditionally performed with robot arms that are either bolted to the ground or placed on stiff linear rails.

In contrast to a high-precision robotic arm that may cost hundreds of thousands of dollars, an unmanned aerial vehicle ("UAV") with perception and comparable transportation capability is an order of magnitude cheaper. Indeed, commercial low-cost UAV development is an active and growing industry where UAV technology has proven to be a valuable tool for mission profiles involving intelligence, surveillance, reconnaissance, and payload delivery. UAV companies continue to introduce UAVs with greater capabilities and, more recently, UAVs have been employed to manipulate and transport workpieces. For example, Amazon recently introduced Amazon Prime Air™, which is a UAV-based delivery system designed to safely delivery packages to customers.

The current generation of low-cost commercial off-the-shelf (COTS) UAVs (i.e., consumer UAVs) is already capable of performing relatively safe indoor operation. Accordingly, UAVs are an excellent candidate to replace robotic arms in warehouses, factories, and laboratories, which may provide automation and transportation of workpieces within a given facility. Existing consumer UAVs, however, suffer from aerodynamic instability and inaccuracy, which makes such UAVs incapable of precision grasping and emplacement. Indeed, modern consumer UAVs hover with a precision of approximately tens of centimeters, which can also be strongly affected by proximity to walls and tables, arm motion, and mechanical interaction between the arm and the environment.

Accordingly, a need exists for a UAV equipped with an arm and end-effector that is capable of high-precision manipulation, transportation, and emplacement of workpieces in an environment (e.g., an indoor environment). A need also exists for a workpiece manipulation system capable of retrofitting an UAV to compensate for such aerodynamic instability and inaccuracy to provide increase endpoint-accuracy. As will be disclosed, the workpiece manipulation system (a) enhances the effective endpoint-accuracy of the UAV and (b) constrains how mechanical forces caused by interaction between an end-effector (e.g., a gripper) and the environment reflect back onto the flight dynamics of the UAV.

SUMMARY OF THE INVENTION

Disclosed herein are aircraft and aircraft systems capable of high-precision manipulation, transportation, and emplacement of workpieces, including, inter alia, a workpiece manipulation system for an aircraft.

According to a first aspect, an aerial workpiece manipulation system to provide high-precision manipulation of a workpiece comprises: an airframe; a plurality of rotor booms extending radially from the airframe; a plurality of propulsors, each of said plurality of propulsors positioned at a distal end of one of said plurality of rotor booms and being electrically coupled to an electronic speed controller (ESC) that is controlled by an aircraft processor; a lifting mechanism coupled to the airframe, wherein the lifting mechanism includes one or more joint actuators to extend or retract the lifting mechanism relative to the airframe; an end-effector coupled to the lifting mechanism, wherein the end-effector includes an end-effector actuator to control an operation of the end-effector to manipulate the workpiece; and a second processor communicatively coupled with the aircraft processor and configured to control operation of the end-effector actuator and the one or more joint actuators.

According to a second aspect, a workpiece manipulation system for use in an aircraft to provide high-precision manipulation of a workpiece comprises: a lifting mechanism to couple with the aircraft, wherein the lifting mechanism includes one or more joint actuators to extend or retract the lifting mechanism relative to the aircraft; an end-effector coupled to the lifting mechanism, wherein the end-effector includes an end-effector actuator to control an operation of the end-effector to manipulate the workpiece; and a processor communicatively coupled with the aircraft processor and configured to control operation of the end-effector actuator and the one or more joint actuators.

According to a third aspect, an aerial workpiece manipulation system to provide high-precision manipulation of a workpiece, the aerial workpiece manipulation system comprises: an airframe; a lifting mechanism coupled to the airframe, wherein the lifting mechanism includes one or more joint actuators to extend or retract the lifting mechanism relative to the airframe; an end-effector coupled to the lifting mechanism, wherein the end-effector includes an end-effector actuator to control an operation of the end-effector to manipulate the workpiece; and a second processor communicatively coupled with the aircraft processor and configured to control operation of the end-effector actuator and the one or more joint actuators.

In certain aspects, the lifting mechanism is a four-bar linkage having four linkage bars connected in a loop by four linkage joints.

In certain aspects, the lifting mechanism is coupled to the airframe at a first linkage joint via a mounting structure.

In certain aspects, the one or more joint actuators are configured to pivot at least one of the four linkage bars about the first linkage joint's axis of rotation.

In certain aspects, the one or more joint actuators include a first joint actuator and a second joint actuator, wherein the first joint actuator is configured to pivot one of the four linkage bars about the first linkage joint's axis of rotation and the second joint actuator is configured to pivot a different one of the four linkage bars about the first linkage joint's axis of rotation.

In certain aspects, the lifting mechanism is removably coupled to the airframe via a mounting structure.

In certain aspects, the lifting mechanism is rotatably coupled to an underside surface of the airframe via a mounting structure.

In certain aspects, the mounting structure is a gimbal system.

In certain aspects, the mounting structure is a U-shaped bracket.

In certain aspects, each of the end-effector actuator and the one or more joint actuators includes a brushless DC back-driveable motor.

In certain aspects, the end-effector is coupled to the lifting mechanism via an arm boom.

In certain aspects, the arm boom is a telescoping arm boom.

In certain aspects, the end-effector comprises one or more feedback sensors to provide feedback data to the second processor.

In certain aspects, the end-effector comprises an optical module that is communicatively coupled with the second processor.

In certain aspects, the optical module includes a first infrared (IR) camera and an IR laser projector.

In certain aspects, the optical module includes a second IR camera that is spaced apart from the first IR camera.

In certain aspects, the optical module further comprises a RGB (red/green/blue) camera.

In certain aspects, the end-effector comprises a pressure sensor that is communicatively coupled with the second processor.

In certain aspects, the pressure sensor is embedded in cast rubber.

In certain aspects, the pressure sensor is positioned on an underside surface of the end-effector.

In certain aspects, the pressure sensor is configured to detect the stable surface when the workpiece is positioned on a stable surface.

In certain aspects, the end-effector comprises a plurality of fiducial markers to aid in determining a position of the end-effector.

In certain aspects, the second processor, via the optical module, is configured to track the plurality of fiducial markers.

In certain aspects, the end-effector is removably coupled with the lifting mechanism to enable the end-effector to be interchanged with a different end-effector.

According to a third aspect, a workpiece manipulation system for use in an aircraft to provide high-precision manipulation of a workpiece comprises: an end-effector shaped to guide the workpiece toward the end-effector; and a lifting mechanism to couple with the aircraft, wherein the lifting mechanism comprises a set of jointed legs, each of said jointed legs comprising a first link pivotally coupled a second link, wherein the end-effector is coupled to each of the jointed legs, wherein the lifting mechanism is configure to passively extend or retract relative to the aircraft upon the end-effector contacting a stable surface, wherein a linear spring element couples a portion of the first link with a portion of the second link.

In certain aspects, each of the jointed legs is configure to move independently to allow for the aircraft to move from side-to-side while maintaining contact between the end-effector and the stable surface.

In certain aspects, the linear spring element is a rubber band.

In certain aspects, the linear spring element is a metal spring.

In certain aspects, the end-effector shaped to define a funnel feature to guide the workpiece toward the end-effector.

In certain aspects, the end-effector is pivotally coupled to each of the jointed legs.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 1b illustrates a block diagram of an example aircraft control system for the VTOL UAV of FIG. 1a.

DETAILED DESCRIPTION

Figure 1A:
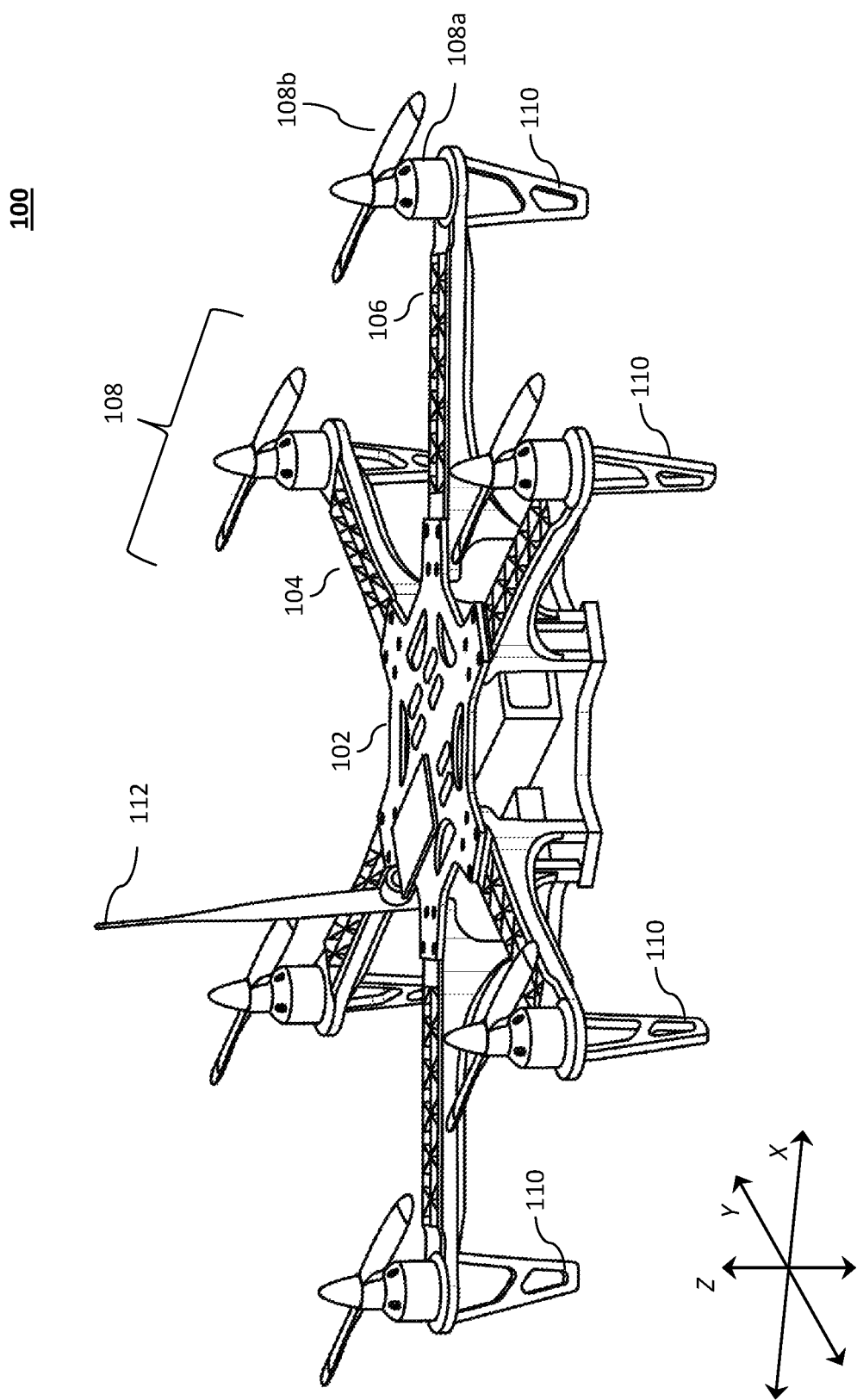
FIG. 1a illustrates an example multi-rotor vertical take-off and landing (VTOL) UAV.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an aircraft configured to achieve millimeter-precision grasping and emplacement of workpieces via a workpiece manipulation system. The endpoint-accuracy of the workpiece manipulation system can be greatly enhanced by exploiting contact between the end-effector and static workpiece (or other stable surface). As can be appreciated, endpoint-accuracy refers to the accuracy of the distal end of the arm boom 206 (e.g., the end-effector 210) in targeting and engaging a workpiece 214. For example, the workpiece manipulation system may be designed to mount on a gimbal capable of and to provide the feedback necessary to stabilize the position of the aircraft, which mitigates reliance on the aircraft manufacturer and broadens future commercial capabilities. The workpiece manipulation system enhances traditional UAV accuracy and grasping in multiple ways. First, the workpiece manipulation system reduces the effects of hovering variation by making contact with a stable surface and acting as a suspension between the end-effector and the UAV. Second, the lifting mechanism and end-effector provide the UAV with information about the environment and the workpiece through various feedback sensors to guide the UAV's approach toward the workpiece.

As will be discussed, the workpiece manipulation system may be configured as a retrofit system to attach to any aircraft capable of carrying its system weight, making ever-improving, low-cost aircraft available for future use. The workpiece manipulation system may include a separate processor to command the aircraft's controller to perform maneuvers to aid in precise pick-and-placement of workpieces. The disclosed workpiece manipulation system may be employed in connection with various aircraft configurations, including, inter alia, multi-rotor consumer VTOL UAVs.

A suitable aircraft for use with a workpiece manipulation system includes the multi-rotor VTOL UAV 100 illustrated in FIG. 1a. As illustrated, the UAV 100 generally comprises an airframe 102 (e.g., a fuselage or other structure), a plurality of rotor booms 104 (e.g., longitudinal booms) extending radially from the airframe 102, landing gear 110, and a plurality of propulsors 108. While a multi-rotor VTOL UAV is illustrated throughout the figures, the teachings of the present disclosure may similarly be applied to other aircraft, including fixed wing aircraft.

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated as a lift motor 108a coupled to, and configured to drive/rotate, a propeller 108b. Each of said plurality of propulsors 108 is placed at a distal end of a rotor boom 104 and oriented to direct thrust downward (relative to the airframe 102). The lift motor 108a may be an electric motor controlled via an electronic speed controller (ESC) 106. To that end, an ESC 106 may also be provided, for example, adjacent the lift motor 108a and integrated (or otherwise coupled) at the distal end of a rotor boom 104. While the UAV 100 is illustrated as having six propulsors 108 (i.e., an hexa-rotor aircraft), a person of skill in the art would understand that additional, or fewer, propulsors 108 may be employed to achieve a desired function and depending on, for example, thrust requirements.

While the lift motors 108a are illustrated at the distal end of each boom 104, the lift motors 108a (or a single lift motor 108a) may instead be positioned at the airframe 102 and configured to drive (rotate) one or more propellers 108b via a gearbox and/or a driveshaft between the lift motor 108a and the one or more propellers 108b. Further, while each boom 104 is illustrated as having only a single propulsor 108, multiple propulsors 108 may be provided at the distal end of each boom 104. For example, a cross-member may be positioned at the distal end of each boom 104 and arranged to space the propulsors 108 from one another (e.g., perpendicularly to the length of the boom 104) or to otherwise prevent interference between propellers 108b (e.g., a staggered/overlapping configuration). The components of the UAV 100 may be fabricated from metal, a composite material, or a combination thereof. To prevent mechanical interference with the workpiece manipulation system, the landing gear 110 may comprise a plurality of posts positioned along the perimeter of the UAV 100 (e.g., at the distal end of each boom). The posts of landing gear 110 and the plurality of rotor booms 104 may be fabricated as a singular unit, or as separate components to be coupled to one another.

Figure 1B:
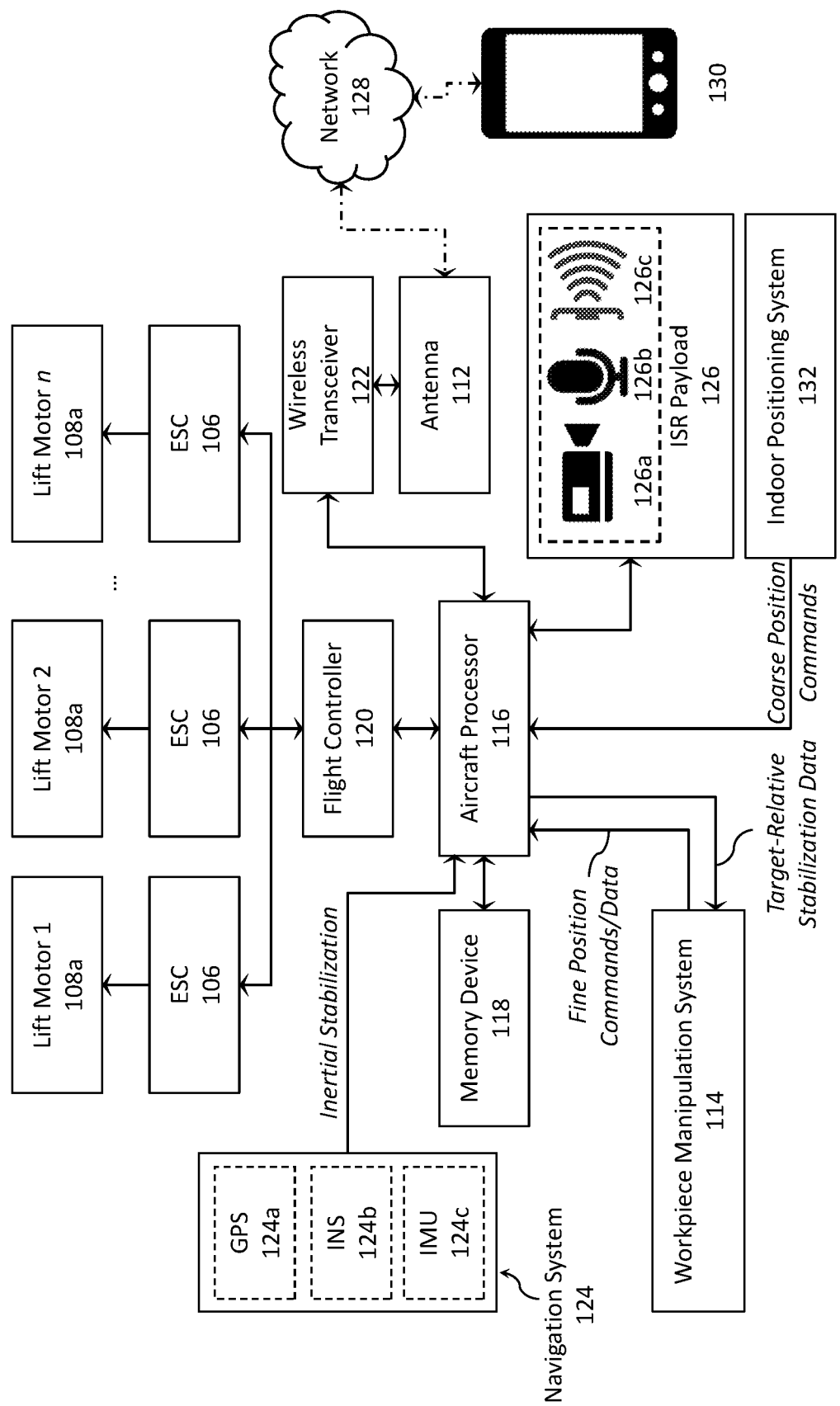

FIG. 1b illustrates a block diagram of an example aircraft control system for the UAV 100. The aircraft control system is configured to control the various aircraft components and functions of the UAV 100. As illustrated, the UAV 100 includes one or more aircraft processors 116 communicatively coupled with at least one memory device 118, a workpiece manipulation system 114, a flight controller 120, a wireless transceiver 122, and a navigation system 124. The aircraft processor 116 may be configured to perform one or more operations based at least in part on instructions (e.g., software) and one or more databases stored to the memory device 118 (e.g., hard drive, flash memory, or the like).

The aircraft control system may further include other desired services, such as a wireless transceiver 122 coupled with an antenna 112 to communicate data between the UAV 100 and a remote device 130 (e.g., portable electronic devices, such as smartphones, tablets, and laptop computers) or other controller (e.g., a base station). For example, the UAV 100 may communicate data (processed data, unprocessed data, etc.) with the remote device 130 over a network 128. In certain aspects, the wireless transceiver 122 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 130 may facilitate monitoring and/or control of the UAV 100 and its payload(s), including the workpiece manipulation system 114 and ISR payload 126.

The aircraft processor 116 may be operatively coupled to the flight controller 120 to control operation of the various actuators (e.g., those to control movement of any flight surfaces) and/or lift motor 108a (e.g., via ESC 106) in response to commands from an operator, autopilot, a navigation system 124, or other high-level system via the wireless transceiver 122. In certain aspects, the aircraft processor 116 and the flight controller 120 may be integrated into a single component or circuit. In operation, the flight controller 120 may dynamically (i.e., in real-time or near real-time) and independently adjust thrust from each of the lift motors 108a on each rotor boom 104 during the various stages of flight (e.g., take-off, cruising, landing) via the ESC 106 to control roll, pitch, or yaw of the UAV 100. In other words, the flight controller 120 can independently control each of the lift motors 108a on a given rotor boom 104 to generate a desired lift thrust for each of the lift motors 108a. For example, when rotors with rotor blades (e.g., propellers) are used, the flight controller 120 may vary the revolutions per minute (RPM) of the rotor and/or, where desired, vary the pitch of the rotor blades. Specifically, the lift motors 108a may be controlled by adjusting power supplied to each electric motor from a power supply (e.g., a battery pack or a battery bank) via the ESC 106.

The aircraft processor 116 may be operatively coupled to the navigation system 124, which may include a global positioning system (GPS) 124a that is communicatively coupled with an Inertial Navigation System (INS) 124b and/or an inertial measurement unit (IMU) 124c, which can include one or more gyros and accelerometers. The GPS 124a gives an absolute drift-free position value that can be used to reset the INS solution or can be blended with it by use of a mathematical algorithm, such as a Kalman Filter. The navigation system 124 may communicate, inter alia, inertial stabilization data to the aircraft processor 116, which may be used to facilitate operation of the workpiece manipulation system 114.

To collect data and/or monitor an area, the UAV 100 may further be equipped with an intelligence, surveillance, and reconnaissance (ISR) payload 126 comprising, for example, one or more cameras 126a (e.g., an optical instrument for recording or capturing images and/or video, including light detection and ranging (LIDAR) devices), audio devices 126b (e.g., microphones, echolocation sensors, etc.), and other sensors 126c to facilitated ISR functionality and provide ISR data (e.g. photographs, video, audio, sensor measurements, etc.). The ISR payload 126 is operatively coupled to the aircraft processor 116 to facilitate communication of the ISR data between the ISR payload 126 and the aircraft processor 116. The ISR data may be used to navigate the UAV 100 and/or control operation of the workpiece manipulation system 114. The ISR payload 126 may be rotatably and pivotally coupled to, for example, the underside surface of the airframe 102 (or another structural component, such as the rotor booms 104) via a gimbal system to enable the ISR payload 126 to be more easily oriented downward to monitor objects below and/or on the ground. The data may be dynamically or periodically communicated from the UAV 100 to the remote device 130 over the network 128 via the wireless transceiver 122, or stored to the memory device 118 for later access or processing.

The aircraft processor 116 may be operatively coupled with an indoor positioning system 132, which measures UAV 100 position within an environment based on sensor readings and/or known navigational maps (e.g., a map of the environment reflecting obstacles and/or boundaries), which may be loaded and stored to the UAV 100 (e.g., at the memory device 118). The indoor positioning system 132 may include, or be communicatively coupled with, various sensors, such as motion capture sensors, radio-beacons, infrared sensors, acoustic sensors, etc. In certain aspects, the indoor positioning system 132 may employ ISR data from the ISR payload 126 to determine the UAV 100 position within an environment.

The aircraft processor 116 may be operatively coupled with the workpiece manipulation system 114 to provide two-way communication between the workpiece manipulation system 114 (e.g., its processor and/or sensors) and the aircraft processor 116. In operation, the aircraft processor 116 may communicate target-relative stabilization data to the workpiece manipulation system 114 and receive from the workpiece manipulation system 114 fine position commands/data. For example, commands may be communicated to the workpiece manipulation system 114 from the aircraft processor 116 based at least in part on commands from an operator, autopilot, the navigation system 124, the indoor positioning system 132, the ISR payload 126, or other high-level systems. Further, the normal positioning and attitude/rate inputs to the flight controller 120 can be augmented by the aircraft processor 116 as finer-scale inputs based at least on part on feedback from the workpiece manipulation system's 114 contact with surfaces and position sensing of the workpiece to be grasped and emplaced.

Figure 2A:
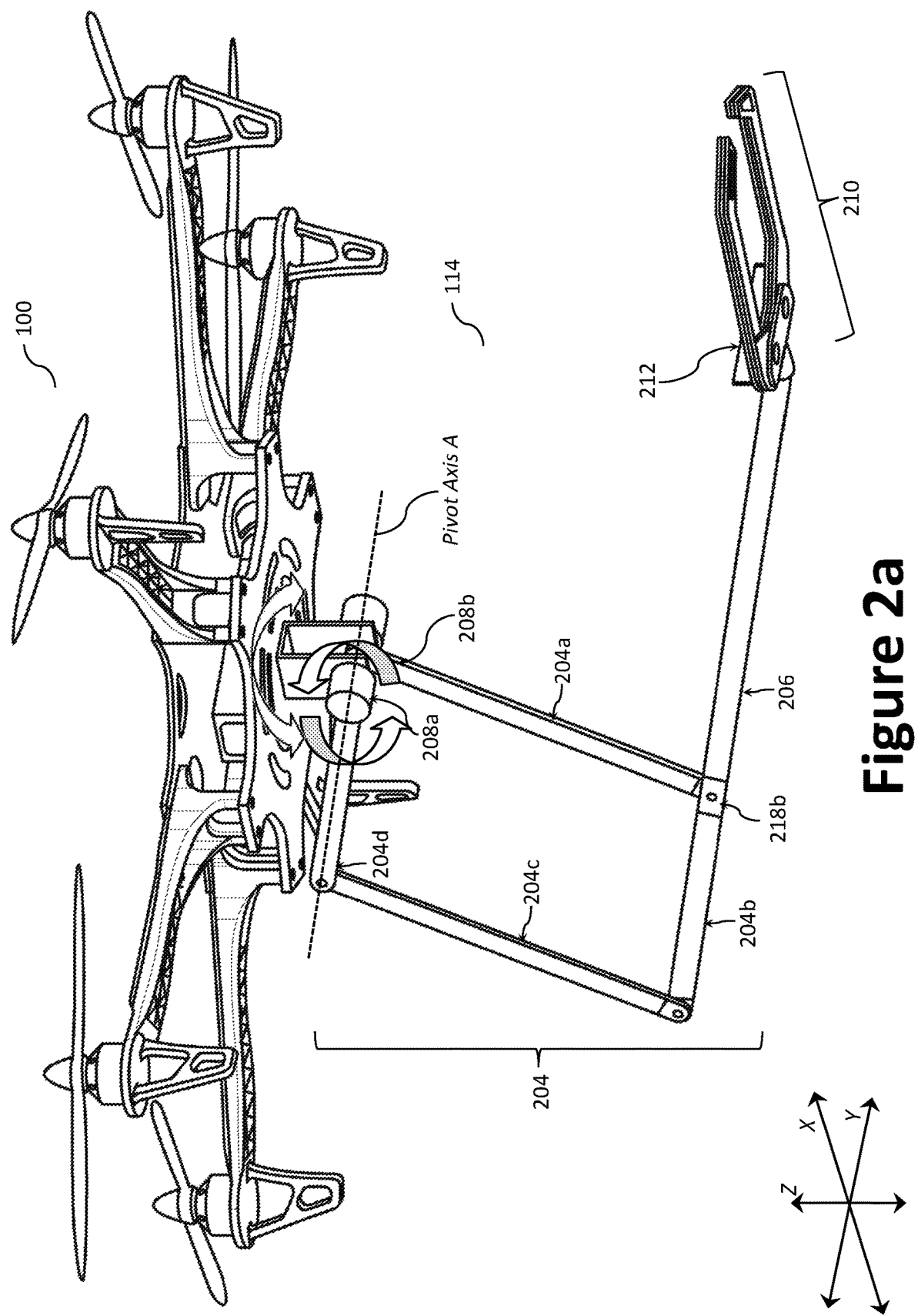
FIGS. 2a through 2c illustrate the UAV of FIG. 1a equipped with an example workpiece manipulation system.
Figure 2B:
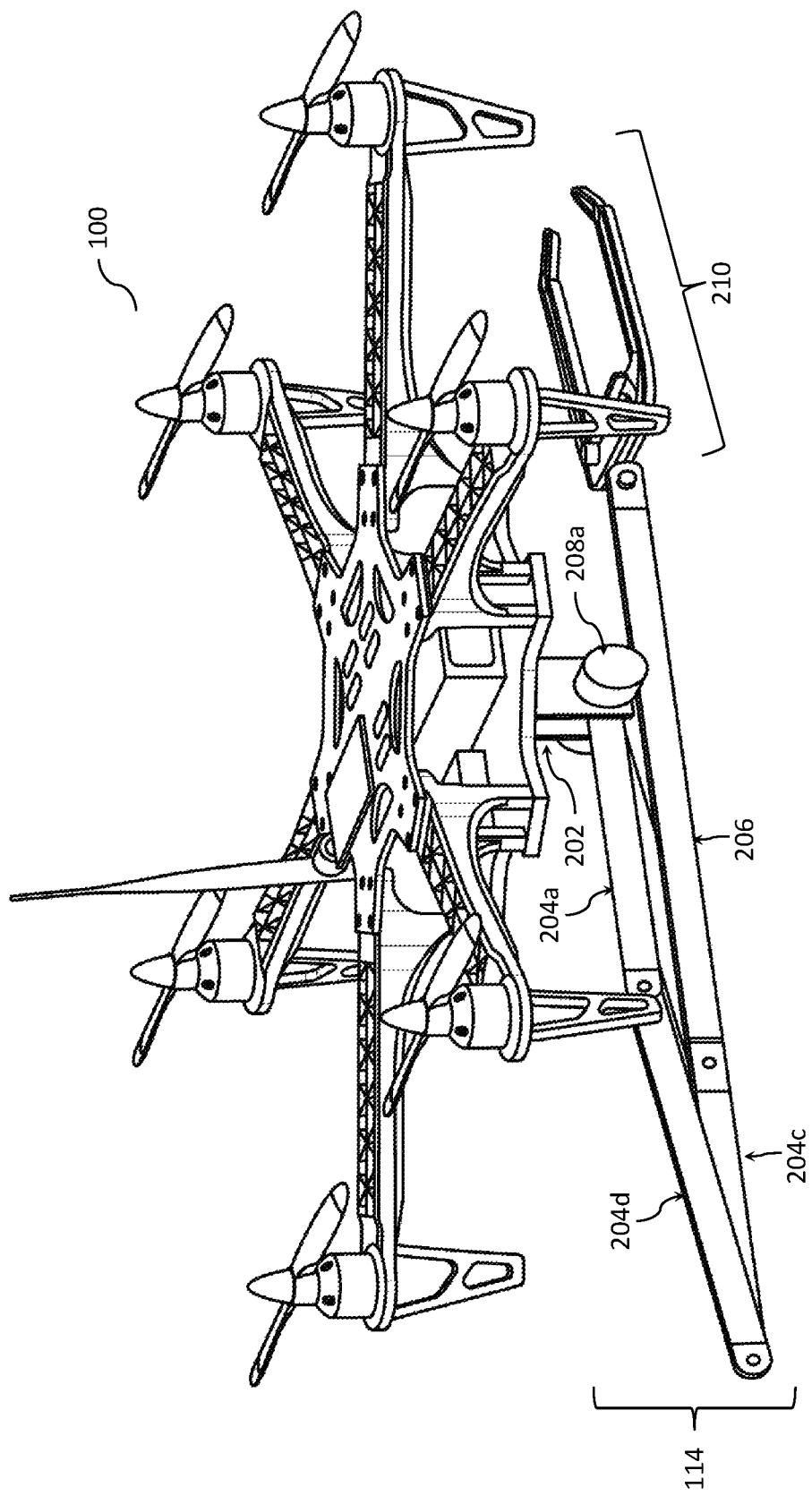
Figure 2C:
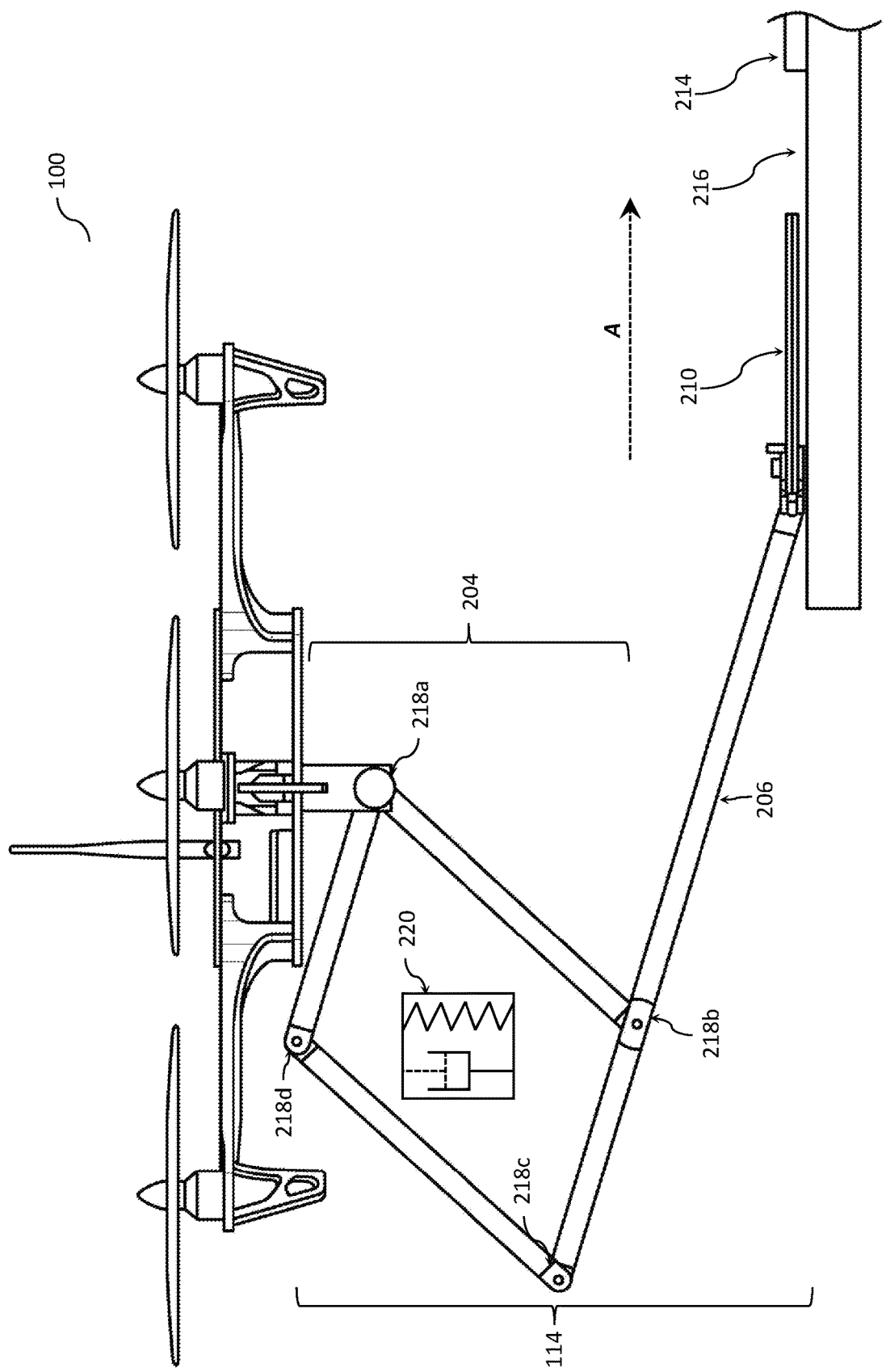

A UAV 100 equipped with an example workpiece manipulation system 114 is illustrated in FIGS. 2a through 2c. Specifically, FIG. 2a illustrated the workpiece manipulation system 114 in an extended position, while FIG. 2b illustrates the workpiece manipulation system 114 is in the stowed position (e.g., as the UAV 100 navigates to a waypoint) and FIG. 2c illustrates a side view of contact between the end-effector 210 and a stable surface 216. The workpiece manipulation system 114 generally comprises a mounting structure 202, a lifting mechanism 204, an arm boom 206, one or more joint actuators 208, and an end-effector 210. As illustrated, the workpiece manipulation system 114 may be rotatably and pivotally coupled to the UAV 100 via the mounting structure 202, which is coupled to the underside surface of the airframe 102. The mounting structure 202 may be fixed or configured to rotate relative to the airframe 102 (e.g. about an axis that is perpendicular to the X-Y plane). The mounting structure 202 may be, for example, a gimbal system or a U-shaped bracket.

The lifting mechanism 204 is illustrated as a four-bar linkage, which is a movable closed chain linkage having four bodies (e.g., linkage bars 204a, 204b, 204c, 204d) connected in a loop by four joints (e.g., linkage joints 218a, 218b, 218c, 218d). Specifically, as illustrated, the first linkage joint 218a pivotally couples the first linkage bar 204a to the fourth linkage bar 204d. The second linkage joint 218b pivotally couples the first linkage bar 204a to the second linkage bar 204b. The third linkage joint 218c pivotally couples the second linkage bar 204b to the third linkage bar 204c. Finally, the fourth linkage joint 218d pivotally couples the third linkage bar 204c to the fourth linkage bar 204d. Each linkage joint may employ, for example, a pivot pin secured by one or more pin holes or slots.

The four-bar linkage may be a planar four-bar linkage where the linkage joints are configured such that the linkage bars 204a, 204b, 204c, 204d move in the same (or parallel) planes. While the lifting mechanism 204 is illustrated as a four-bar linkage, additional linkage bars may be provided to mitigate jamming or binding of the lifting mechanism 204 as it traverses throughout a full range of motion. For example, a fifth linkage bar may be pivotally connected to the second and fourth linkage bars 204b, 204d via a pair of toggles such that the fifth linkage bar is parallel to the first and third linkage bars 204a, 204c.

The end-effector 210 may be coupled to the lifting mechanism 204 via an arm boom 206, which may be coupled with the lifting mechanism 204 at the second linkage joint 218b. In certain aspects, the arm boom 206 and the second linkage bar 204b may be formed as a unitary structure. A function of the arm boom 206 is to increase the distance between the end-effector 210 and the lifting mechanism 204. To that end, the arm boom 206 may be a telescoping boom, which may employ an actuator assembly, such as a ball screw/nut assembly driven (e.g., adjusted in length) by an electric motor or other actuator. The various hardware, such as the mounting structure 202, the linkage bars 204a, 204b, 204c, 204d, and the arm boom 206, may be fabricated from one or more lightweight materials, including metals, metal alloys, plastics (e.g., 3d printed plastic), and/or composite materials. Most of the mass of the workpiece manipulation system 114 can be attributed to the joint actuators 208, which are positioned near the airframe 102 of the UAV 100.

A pair of joint actuators 208a, 208b may be coupled to the mounting structure 202 and the lifting mechanism 204 at the first linkage joint 218a to raise and lower the arm boom 206 (and the end-effector 210) relative to the airframe 102. For example, the first joint actuator 208a may be configured to drive the fourth linkage bar 204d such that it pivots at one end (i.e., the end adjacent the first linkage joint 218a) about the first linkage joint's 218a axis of rotation (identified as Pivot Axis A), while the second joint actuator 208b may be configured to drive the first linkage bar 204a such that it pivots at one end about the first linkage joint's 218a axis of rotation.

The joint actuators 208 may employ, for example, brushless DC back-driveable motors. In operation, the two joint actuators 208a, 208b may be independently controlled to raise and lower the end-effector 210 relative to the UAV 100 via the lifting mechanism 204, and to adjust the angle of the arm boom 206. To minimize reflected friction and inertia onto the lifting mechanism 204, the joint actuators 208 may use a small gear ratio (e.g., 10:1 or less). Each of the joint actuators 208a, 208b may include a motor drive circuit that is controlled by the workpiece manipulation processor 402. The joint actuators 208 may be driven by high-bandwidth current control, which enables the joint actuators 208 to approximate the behavior of ideal torque sources.

The workpiece manipulation system 114 may employ direct-drive and impedance control. Because the lifting mechanism 204 is very rigid and has low-inertia, force control at the endpoint of the arm boom 206 (e.g., the end-effector 210) is possible using only the inverse Jacobian of the lifting mechanism 204 to relate endpoint forces to required motor torques. This enables the workpiece manipulation system 114 to control the mechanical impedance of the lifting mechanism 204 by commanding motor torques in response to kinematic feedback of the lifting mechanism 204. For example, stiffness is controlled by commanded force as a function of position displacement, while damping is controlled by commanding force as a function of velocity displacement. Proper selection of arm impedance will enable the lifting mechanism 204 to control the contact properties of the end-effector 210 and the workpiece 214. The arm impedance may also provide stabilizing forces to the UAV 100, which will reduce variations in UAV 100 position induced by air currents, measurement errors, and other disturbances.

The endpoint-accuracy of the workpiece manipulation system 114 can be greatly enhanced by exploiting contact between the end-effector 210 and the stable surfaces 216. For example, consider a workpiece 214 that is resting on a flat stable surface 216. Placing the end-effector 210 directly onto the workpiece 214 would require accurate positioning in six axes—three Cartesian and three rotational. The workpiece manipulation system 114, on the other hand, can explicitly contact the stable surface 216 before approaching the workpiece 214, thereby using the stable surface 216 to orient and stabilize three of the end-effector's 210 degrees of freedom (i.e., vertical displacement and two rotational degrees of freedom). Active feedback control can ensure constant contact with the stable surface 216 as the UAV 100 moves the final centimeters (identified as Direction A) towards the workpiece 214.

As illustrated in FIG. 2c, the workpiece manipulation system 114 can move an end-effector 210 relative to the UAV 100 and toward the workpiece 214 along a stable surface 216 (e.g., a table, or other static mechanical surface). The lifting mechanism 204 acts as a spring-damper suspension 220 to provide active feedback and to maintain contact between the lifting mechanism 204 and the stable surface 216 near the workpiece 214. The dynamic capability of the lifting mechanism 204 effectively acts as a spring-damper suspension 220 between the end-effector 210 and the UAV 100 to maintain contact between the end-effector 210 and the stable surface 216, while decoupling interaction forces at the end-effector 210 from the dynamics of the UAV 100.

Additional sensing in the lifting mechanism 204 and the end-effector 210 can provide the UAV 100 with information to localize itself with respect to the workpiece 214 and to navigate toward and grasp the workpiece 214. For example, as will be discussed, the end-effector 210 may be provided with a depth camera and/or one or more touch sensors to measure relative orientation of the end-effector 210 vis-à-vis the workpiece 214. Information from the one or more sensors reflecting, for example, the workpiece manipulation system's 114 kinematic state can be communicated to the aircraft processor 116 to provide information about the UAV's 100 precise position with respect to stable surfaces 216 and workpieces 214. This information enhances localization and navigation of the UAV 100 to enable precise grasping of the workpiece 214. Once the workpiece 214 is grasped by the end-effector 210, the lifting mechanism 204 may stabilize the workpiece 214 during transport to prevent, for example, any potential sloshing and spillage. For example, if the workpiece 214 is held with the arm boom 206 partially extended, the end of the arm boom 206 will have sufficient range of motion to actuate in order to minimize accelerations on the workpiece 214 as the UAV 100 moves through the environment. This stabilization control can be performed using, for example, a single spring-damper gain setting that is selected using optimization and does not actively read accelerometer data, or through active vibration identification and suppression by reading accelerometer data on the UAV 100 and/or the workpiece 214. In one example, the lifting mechanism 204 may assume the stowed position of FIG. 2b, whereby the lifting mechanism 204 and/or the end-effector 210 is secured in place. This stowed configuration brings the arm boom 206 and workpiece 214 close to the UAV's center of mass, which provides the UAV 100 with the most favorable flight dynamics.

The end-effector 210 is the part of the workpiece manipulation system 114 that interacts with the workpiece 214 and the environment. Suitable end-effectors 210 for manipulation, transportation, and emplacement of workpieces 214 include grippers, magnets, and vacuum cups. For example, where the UAV 100 needs to pick up the workpiece 214, a gripper may be employed as an end-effector 210. Where the UAV 100 is configured to perform other manufacturing operations, the end-effector 210 may include tools such as brushes, cutting tools, drills, sanders, screwdrivers, spray guns, and welding guns. The end-effector 210 may further include other devices to monitor the environment, such as anti-collision sensors and cameras.

Figure 3:
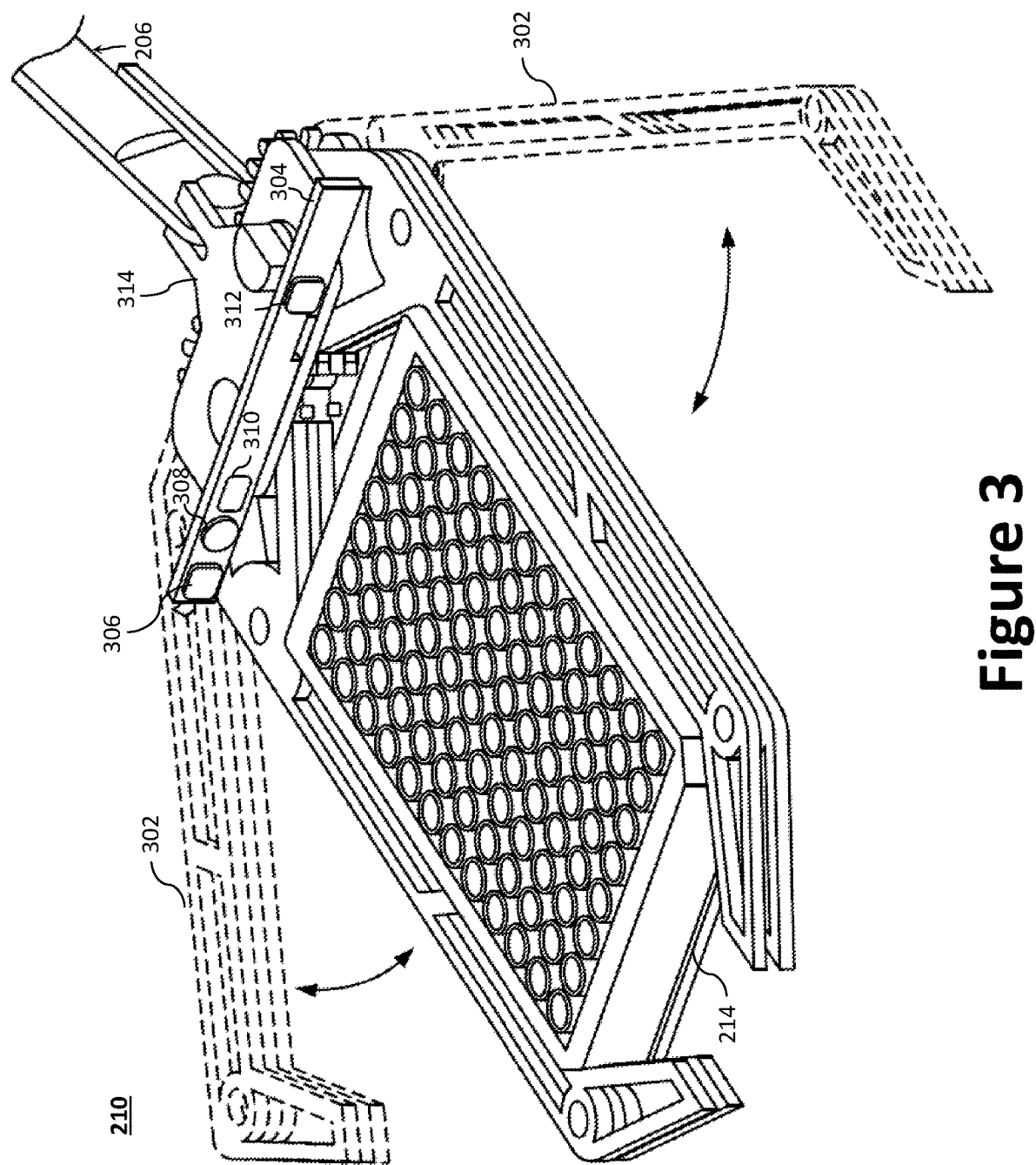
FIG. 3 illustrates an example end-effector to physically grasp a workpiece.

FIG. 3 illustrates an example end-effector 210 configured as a gripper to physically and reliably grasp a workpiece 214. As illustrated, the end-effector 210 generally comprises a base 314 and a set of finger members 302 pivotally attached to the base 314, where the base 314 pivotally couples with the arm boom 206. The end-effector 210 includes one or more end-effector actuators 212 to selectively control the finger members 302. For example, each of the finger members 302 may include gearing teeth at one end (e.g., where it couples to the base 314) that engage a driving gear driven by an effector actuator 212. The end-effector actuator 212 may employ, for example, a brushless DC back-driveable motor to drive (i.e., rotate) a gear that engages the corresponding gear teeth of the two finger members 302 at their pivot points.

The shape of the end-effector 210 (e.g., the finger members 302) may be design to exploit the shape of a specific workpiece 214, which is illustrated as a rectangular prism, to minimize actuated degrees of freedom for the end-effector 210. For example, as illustrated, the finger members 302 are shaped to correspond with the lengthwise sides of the workpiece 214 where the tips bend inward to prevent the workpiece 214 from sliding outward (i.e., away from the base 314). In certain aspects, the finger members 302 may include pivoting joints along their length to provide fully articulating finger members.

The contact surfaces between the finger members 302 and the workpiece 214 may further be shaped to increase friction/engagement. For example, the workpiece 214 may include one or more protrusions (or recesses) to mate with corresponding recesses (or protrusions) on the end-effector 210 (e.g., the finger members 302 or the base 314.). The finger members 302 may be padded or provided with a low-friction surface (e.g., rubber) to enhance their grip on a given workpiece 214. The finger members 302 may further include electromagnets to selectively bond with the workpiece 214.

In certain aspects, the end-effectors 210 may be interchangeable. To that end, a quick connect device may be provided at a distal end of the arm boom 206 to physically and communicatively engage a corresponding quick connect device positioned on the base 314 of the end-effector 210. To that end, the quick connect device may provide two mating parts, a master-side and a tool-side designed to lock or couple together, carry a payload, and have the ability to pass utilities such as electrical signals, pneumatic, water, etc. Accordingly, via the quick connect device, an operator would be enabled to interchange quickly replace the type of end-effector 210 installed upon the arm boom 206.

Sensing within the end-effector 210 is necessary to provide millimeter accuracy position and orientation with respect to the workpiece 214. Therefore, for optimal grasping contact with the workpiece 214, the end-effector 210 may provide sensor feedback to the workpiece manipulation system 114 (e.g., the workpiece manipulation processor 402) to adjust orientation of the lifting mechanism 204. For example, the end-effector's 210 sense of touch, coupled with distance sensors, can help both the workpiece manipulation system 114 and the UAV 100 to orient the end-effector 210 with regard to the workpiece 214, and to ensure that the workpiece 214 is securely grasped. Accordingly, in addition to an end-effector actuator 212 to selectively open/close the two finger members 302, the end-effector 210 may include an optical module 304 and other feedback sensors to provide feedback to the UAV 100 about the workpiece 214 and an environment adjacent or near the workpiece 214.

The optical module 304 may include, for example, a first infrared (IR) camera 306, a RGB (red/green/blue) camera 308, an IR laser projector 310, a second IR camera 312, etc. The optical module 304 may be position toward the back of the end-effector 210 (e.g., on the base 314) and configured with a forward field of view to capture images of the workpiece 214 and environment. The optical module 304 may employ one or more sensing technologies to achieve depth perception, 3D imaging, interior mapping, and feature tracking. The first and second IR cameras 306, 312, together with the IR laser projector 310, provide depth information to calculate a spatial relationship between end-effector 210 and the workpiece 214. To that end, the first IR camera 306 and second IR camera 312 may be spaced apart from one another to capture different views (i.e., angles) of the workpiece 214 and environment. Using this data, the workpiece manipulation system 114 (via its workpiece manipulation processor 402) can measure the 3-D location of the workpiece 214 with respect to the end-effector 210 to a resolution within 1 mm.

Other feedback sensors may include, for example, pressure transducers, touch sensors, etc. Touch sensing is used to facilitate impedance control of the lifting mechanism 204 and can be achieved using pressure sensors embedded in cast rubber. For example, one or more pressure sensors may be positioned on an underside surface of the end-effector 210 to contact the stable surface 216 on approach to the workpiece 214. For example, tactile sensors (e.g., pressure transducers or strain gauges) may be placed on one or more of the finger elements 302, the base of the end-effector 210 on the front surface (where sensors could sense contact forces on finger members 302) or on the bottom surface (where base 314 would contact the ground); or at member 206. Additionally, the motors (which may be position in the base 314) that drive gears 304 could be used to perform tactile feedback through current sensing in the motor circuit. The workpiece manipulation system 114 can use information from the optical module 304 to plan a "coarse" approach route to quickly move the end-effector 210 and its touch sensors toward the end-effector 210 within a few millimeters of the workpiece 214.

The workpiece manipulation system 114 may further employ barcodes (e.g., positioned on the workpiece 214) to identify the workpiece 214 via the RGB camera 308. Multiple fiducial markers (e.g., April tags or ARtags) on the end-effector 210 (e.g., the finger members 302) can aid in the determination of the exact position of the end-effector 210. The workpiece manipulation processor 402, via the optical module 304, is configured to track the plurality of fiducial markers.

While the end-effector 210 is illustrated as a claw-shaped active gripper with two finger members 302, other forms of grippers are contemplated to provide a desired grip force, such as pinching, entrapment, capture, and vacuum suction. To that end, other end-effectors may be coupled to the arm boom 206 to engage a workpiece 214. Indeed, the end-effector 210 may be an active or a passive end-effector. Indeed the end-effector 210 may use active actuation in the end-effector (FIG. 3), or it may use passive mechanisms that self-align with a specific workpiece (FIGS. 6a through 6d). Additionally, an end-effector may use active sensing to carefully align the end-effector attachments and workpiece, or the end-effector may really on grippers which do not require extensive alignment or have self-aligning features. One example of an "active actuation" with "passive sensing" uses granular media. For example, where the shape of the workpiece 214 is unknown or inconsistent, the end-effector 210 may employ a flexible hollow sphere (or portion of a sphere) that is filled with a granular material that can conform to the shape of the workpiece 214. Once the flexible hollow sphere conforms to the shape of the workpiece 214, a vacuum is used to remove air from the flexible hollow sphere, which causes the granular material to hold its shape around the workpiece 214. Once the end-effector 210 is ready to release, the air is returned to the flexible hollow sphere to cause the granular material to loosen and the flexible hollow sphere returns to its original shape. U.S. Pat. No. 8,882,165, which issued on Nov. 11, 2011 to Hod Lipson et al. and titled "Gripping and releasing apparatus and method," describes an example passive-sensing universal gripper that includes a mass of granular material encased in an elastic membrane.

FIG. 3 illustrates an actively-actuated gripper (the fingers 302 are driven by geared motors within the base 314), but the fingers 302 also demonstrate some self-aligning features such that the end-effector 210 does not need to be perfectly aligned with the workpiece before closing its fingers to grasp the object. Note that self-alignment can be aided by the low-inertia and back drivable robot arm design. An example of a passive-actuation and passive-sensing is a rigid gripper that self-aligns with a rigid workpiece of known shape is illustrated in FIGS. 6a through 6d. For example, if the workpiece is a rigid cube with a lip on top-side, then the gripper may be driven by the UAV 100 into the workpiece, with an interface that slides underneath the lip and uses gravity to hold the workpiece in place on the gripper.

Figure 4:
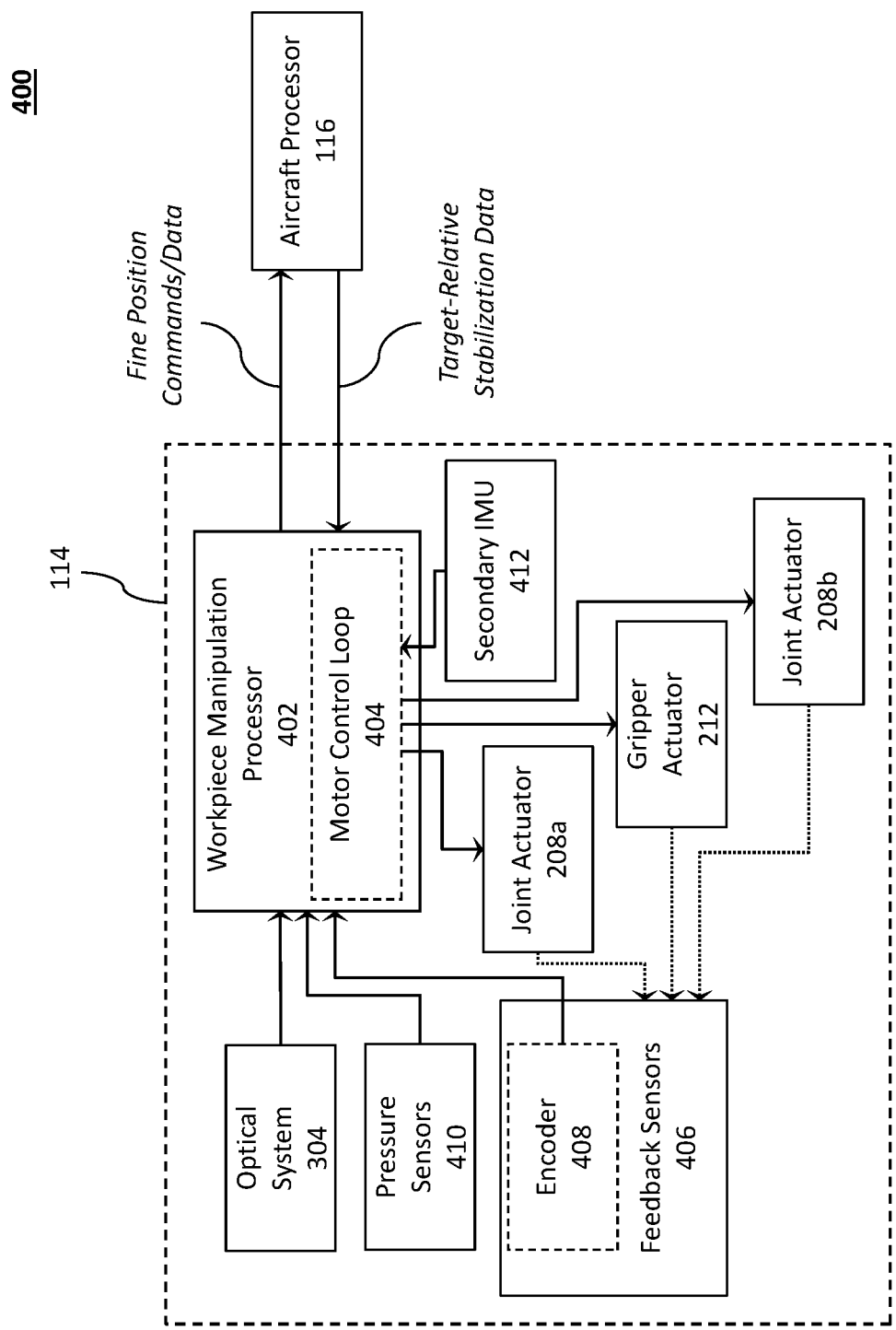
FIG. 4 illustrates an example diagram of an integrated architecture for the workpiece manipulation system.

FIG. 4 illustrates a diagram of an example integrated architecture 400 for the workpiece manipulation system 114. In operation, the UAV 100 is capable of coarse positioning, based at least in part on the indoor positioning system 132 (or ISR payload 126) and inputs from the on-board IMU 124c. Specifically, such inputs are used by the aircraft processor 116 for coarse stabilization. The workpiece manipulation system 114, however, provides additional inputs to the aircraft processor 116 of a similar type to the UAV 100 feedback laws, but at a finer resolution due in part to the higher-fidelity information that the workpiece manipulation processor 402 (e.g., a micro-controller) derives from other feedback sensors, such as target position sensing, pressure sensing, and joint position sensing. Therefore, the coarse positioning and attitude/rate inputs may be augmented by finer-scale inputs from the workpiece manipulation system 114.

Integration of the workpiece manipulation system 114 with the UAV's 100 can be facilitated using the workpiece manipulation processor 402, which is designed to both communicate with the aircraft processor 116 of the host UAV 100 and to control the operation of the workpiece manipulation system 114, including its various actuators (e.g., the first joint actuator 208a, the second joint actuator 208b, and the end-effector actuator 212). That is, each of the joint actuators 208a, 208b and end-effector actuator 212 may include, for example, a motor drive circuit that is controlled by the workpiece manipulation processor 402.

One or more feedback sensors 406 are configured to monitor the force and position of the first joint actuator 208a, the second joint actuator 208b, and the end-effector actuator 212. The one or more feedback sensors 406 may also include a current sensor to monitor current to the various actuators to determine a load. The output signals from one or more feedback sensors 406 may be encoded by the encoder 408 and provided as feedback to the workpiece manipulation processor 402 for using in, inter alia, a motor control loop 404. The encoder 408 may be attached to a rotating object (e.g., the motor or linkage joint) to measure rotation, which enables the workpiece manipulation processor 402 to determine displacement, velocity, acceleration, or the angle at a rotating sensor. Indeed, the encoder(s) 408 can be mounted at the actuator, or at the linkage joint itself.

The workpiece manipulation processor 402 may also receive feedback from the other feedback sensors (e.g., one or more endpoint pressure sensors 410) and the optical module 304, which provides target position sensing data. The workpiece manipulation system 114 is therefore capable of providing: (1) tight inner-loop control for arm impedance control; (2) low-level feedback to the UAV 100 inner loops (attitudes and rates) to improve the accuracy of UAV 100 hover; and (3) higher-level commands to the aircraft processor 116 to command the UAV 100 to approach the workpiece 214. The integrated architecture 400 allows for high-bandwidth end-point control of the pick-and-place operation, with the UAV 100 treated as an element of the overall pick-and-place system.

A secondary IMU 412 may be provided to afford the workpiece manipulation system 114 with an additional 6-axis gyro and accelerometer combination to augment and compensate for any potential shortcomings in the UAV's 100 avionics, indoor positioning system 132, and navigation system 124. Accordingly, the workpiece manipulation processor 402 may also receive data from a redundant secondary IMU 412. The secondary IMU 412 may be positioned on, for example, the end-effector 210.

Figure 5A:
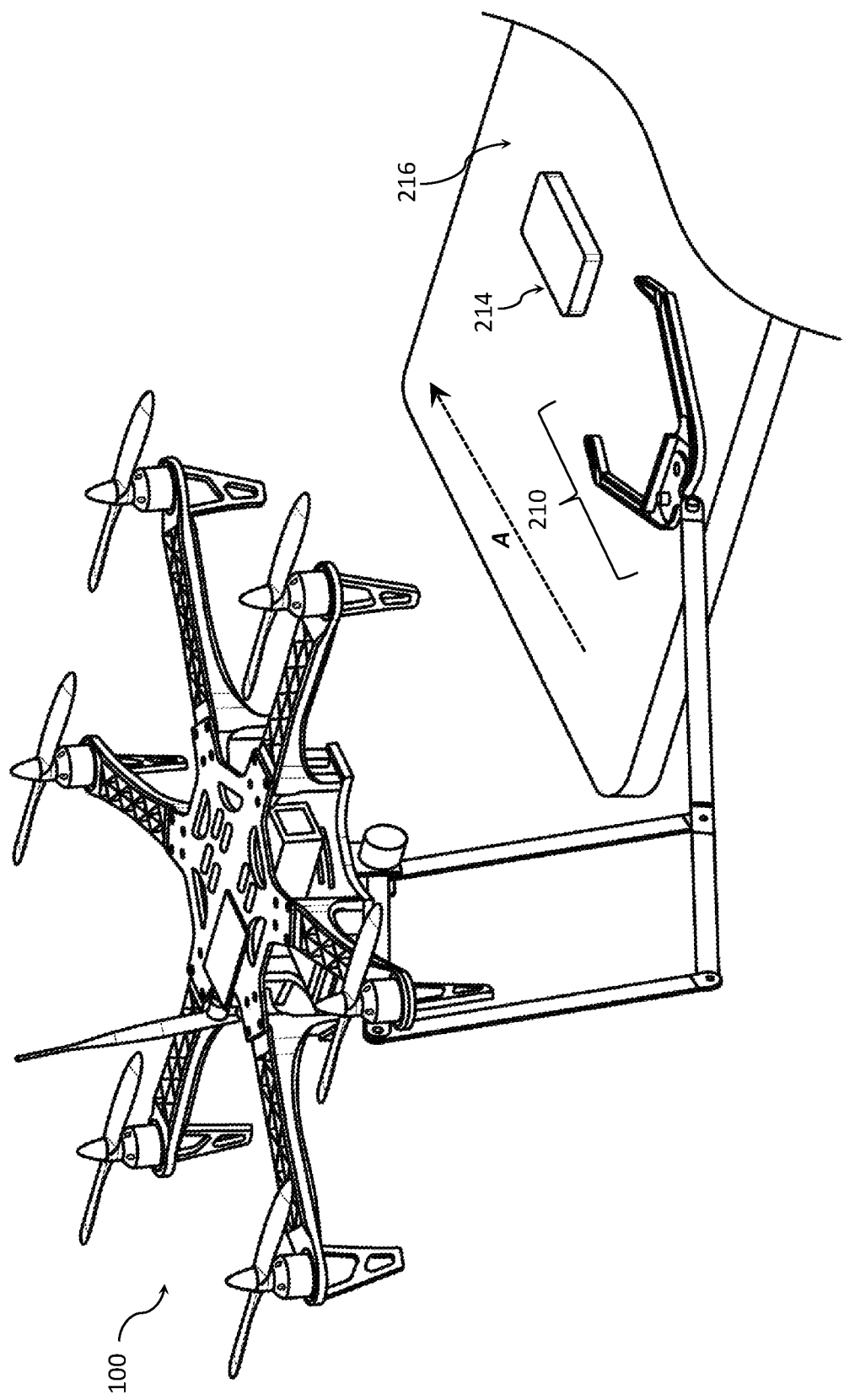
FIGS. 5a through 5c illustrate an example operation of the UAV as it travels toward, and grasps, a workpiece.
Figure 5B:
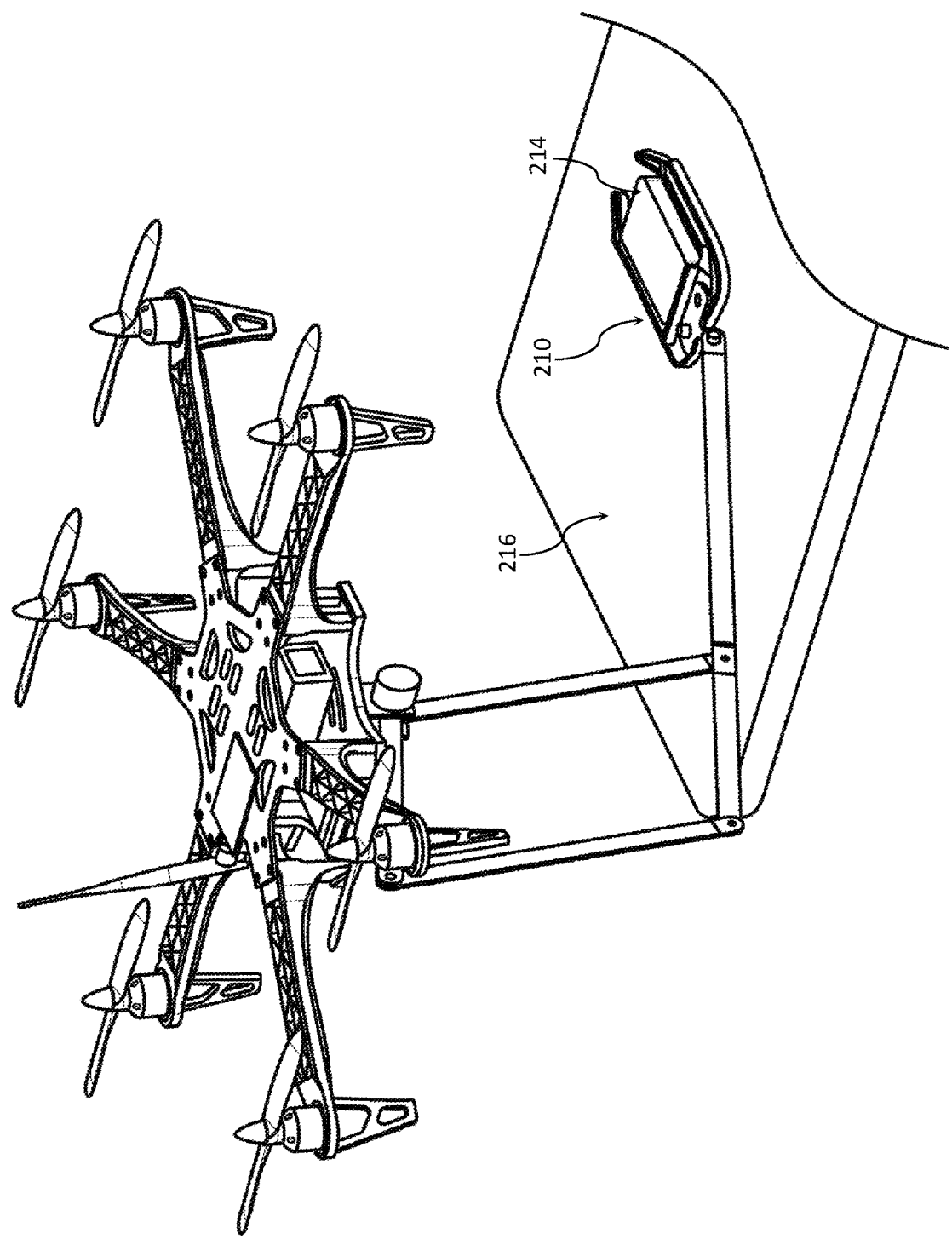
Figure 5C:
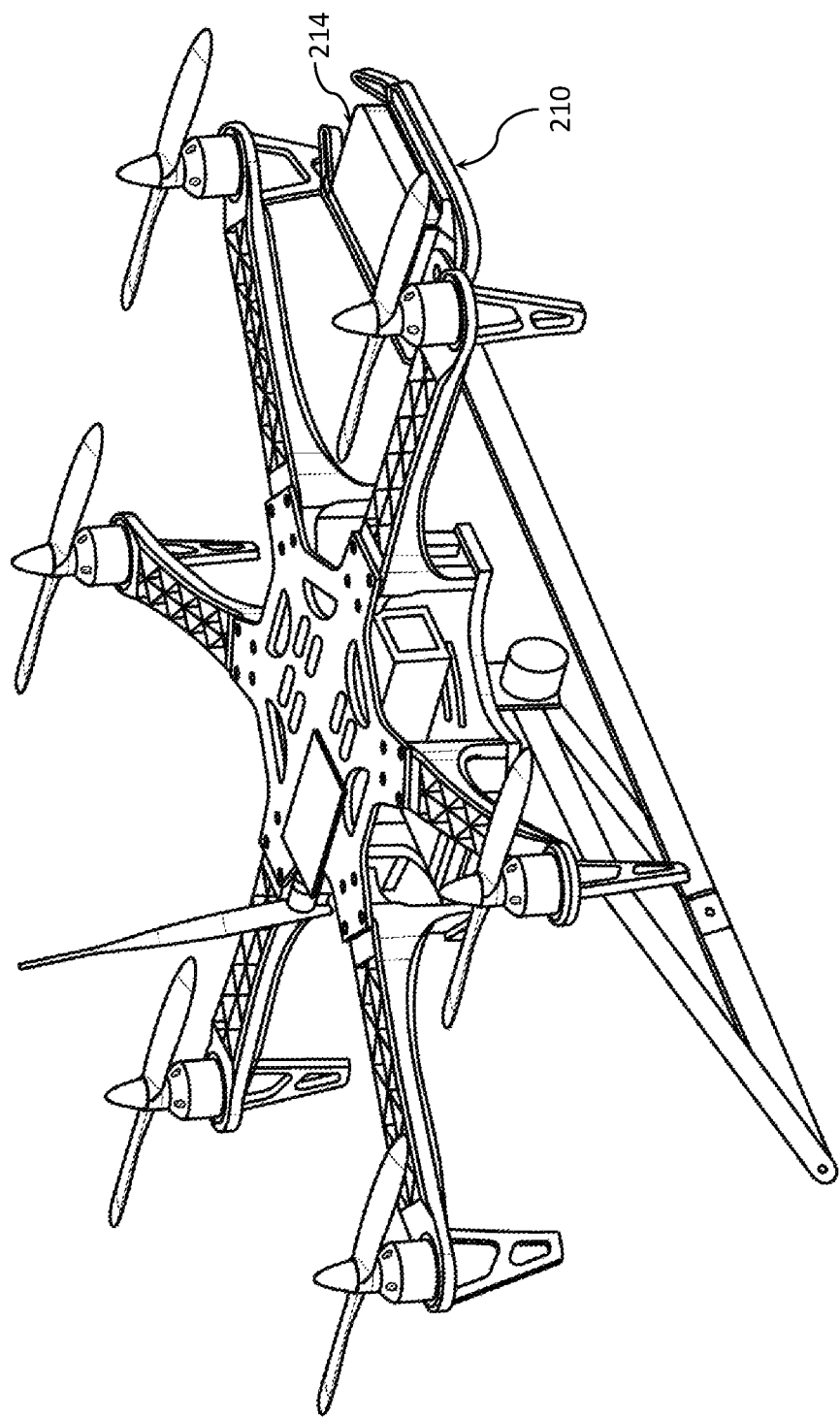

FIGS. 5a through 5c illustrate an example operation of the UAV 100 as it travels toward and grasps a workpiece 214. FIG. 5a illustrates the UAV 100 with the workpiece manipulation system 114 lowered to a deployed position from its stowed position, where the endpoint (e.g., the end-effector 210) is contacting the stable surface 216 at a touch-down point. As illustrated, the touchdown point is adjacent the workpiece 214. On approach to the target location, the UAV 100 does not need precise localization because the arm boom 206 lowers until the end-effector 210 contacts a solid stable surface 216 near the target workpiece 214. Touch sensors on the bottom of the end-effector 210 provide closed loop feedback for UAV 100, keeping it vertically stable. The optical module 304 identifies the location of the workpiece 214 and any obstacles in relation to the UAV 100.

The UAV 100 uses the stable surface 216 to slide the end-effector 210 as it travels toward the workpiece 214 (identified as Direction A) to perform millimeter-accurate pick-up operation. The UAV 100 travels toward the workpiece 214 until it is within the end-effector's 210 envelope. While the stable surface 216 is illustrate as large with initial touch-down point being relatively far from the workpiece 214, the endpoint can be configured to touch down within a short distance (e.g., a 2-10 centimeters, or directly on top) of the workpiece 214 using, inter alia, visual positioning and AR Tags. In this example, the UAV 100 uses a horizontal stable surface 216 to orient itself, but any stable surface 216 in any orientation could be used, such as a vertical wall near the workpiece 214. The workpiece 214 itself could also be used as the stable surface 216 if it is properly constrained.

As illustrated in FIG. 5b, once the workpiece 214 is within the end-effector's 210 envelope, the end-effector actuator 212 closes the finger members 302 around the workpiece 214. Touch sensors on the end-effector 210 (e.g., the finger members 302) provide feedback to the workpiece manipulation processor 402 to ensure a secure grip is established with the workpiece 214. Contact between the end-effector 210 (via the lifting mechanism 204) and the stable surface 216 will aid flight stability as the UAV 100 captures the workpiece 214 and prepares to fly away. As illustrated in FIG. 5c, the UAV 100 stows the lifting mechanism 204 and the workpiece 214 into transport position, adjusting the arm relative to system center of gravity to provide the most efficient flight dynamics. The lifting mechanism 204 may also be used to stabilize the workpiece 214 during flight.

While the above-described lifting mechanism 204 and end-effector 210 use active components (e.g., motors, actuators, etc.), in certain aspects, a passive lifting mechanism 600 600 and a passive end-effector 610 may be used. Certain aerial manipulation systems uses non-compliant robot limbs with high rotational inertia; however, these systems do not provide a decoupling between the UAV 100 and impact dynamics of contact between the lifting mechanism and the environment (e.g., the stable surface 216, a flat surface, or a hard stop that is holding a workpiece 214). On the contrary, these designs can amplify the impact dynamics, as viewed from the UAV 100, which can make existing systems very brittle to uncertainty. A passive lifting mechanism 600, however, may be configured to provide directed compliance and directed constraint to minimize negative effects of impact, provide flexibility between orientation of the end-effector 610 and orientation of the UAV 100, and exploit reliable constraints in the environment. A passive mechanism (including, inter alia, a passive ankle) may be employed in applications where simplicity and cost are needed.

FIG. 6a through 6d illustrate an example passive lifting mechanism 600, which employs a passive end-effector 610 designed (e.g., sized and shaped) to achieve reliable grasping of a specific workpiece 214. Because there is no requirement for actuation, the interfacing geometry between the end-effector 610 (illustrated as a passive gripper) and the workpiece 214 should be controlled more than an actuated end-effector 210 (FIG. 3). As with the lifting mechanism 204, the passive lifting mechanism 600 can be installed onto a COTS UAV 100 to enable reliable grasping of workpieces 214—i.e., aerial manipulation.

Aerial manipulation achieved through robot limbs with highly-geared RC-servo motors can exhibit high rotational inertia and high friction; along with either low or zero back-drivability. The passive lifting mechanism 600, however, demonstrates that a robot limb with low friction, low inertia, and adequate compliance (i.e., stiffness) can enhance the aerial manipulation capabilities of a UAV 100. This improved performance results from the ability of the robot arm to partially decouple the interactive dynamics of contact between the end-effector 610 and the environment, and the end-effector 610 and the UAV 100 flight dynamics.

Therefore, a passive end-effector 610 presents two problem-solutions: (1) a lightweight end-effector 610 with a passive "ankle joint 616" enables an end-effector 610 to maintain surface contact with a stable surface 216 (e.g., flat surface/table), even as the UAV 100 may be moving in pitch degree of freedom; and (2) an articulated limb that uses passive springs can generate favorable compliance such that the distal end of the passive lifting mechanism 600 can maintain contact with a stable surface 216, even as the UAV 100 may be moving in pitch, roll, and vertical direction. The passive end-effector 610 shows that the favorable compliance generated by the passively controlled limb damps out the stable surface 216 effect oscillations, allowing for operation at precise heights near the stable surface 216.

As illustrated, the passive lifting mechanism 600 may include a lightweight robotic leg portion 620 having a passive end-effector 610 at its distal end and coupled to the UAV via a base 602. The base 602 may be secured to the underside of the UAV's 100 airframe 102 in a manner similar to the mounting structure 202 of FIGS. 2a and 2b. As illustrated, the robotic leg portion 620 may include a set (e.g., two) of separate jointed legs, each generally comprises an upper link 604 (akin to a femur), an intermediate link 606 (akin to a shin), and a lower link 608 (akin to a foot). The structural components of the lightweight robotic leg portion 620 (e.g., the upper link 604, the intermediate link 606, the lower link 608, etc.) may be provided with a plurality of holes to allow for different limb geometry and to reduce weight of the structure, however the holes may be omitted.

As illustrated throughout FIGS. 6a through 6d, the end-effector 610 may be supported by two separate/individual knee and hip joints 614, 616. Each of the knee joints 614 may be provided with an individual spring elements 618, which can move independently. A two-leg approach provided a wider basin of support for the UAV 100, while the independent motion of the two legs also enhances the passive lifting mechanism's 600 tolerance to roll-motion of the UAV 100. A two-leg approach and end-effector 610 design also allows for the UAV 100 to move side-to-side, while maintaining contact between the end-effector 610 and the stable surface 216. This capability is enhanced by the independent motion of the two legs, which enable the end-effector 610 to maintain surface-contact with the stable surface 216 as the flight vehicle moved in roll.

The upper link 604 may be pivotally coupled at its proximal end with the base 602 via a hip (upper) joint 612. The upper link 604 may be pivotally coupled at its distal end with a proximal end of the intermediate link 606 via a knee (intermediate) joint 614. The intermediate link 606 may be pivotally coupled at its distal end with a proximal end of the lower link 608 via an ankle (lower) joint 616. The lower link 608 may be coupled (fixedly or pivotally, as desired) at its distal end with the passive end-effector 610. While the lower link 608 and the end-effector 610 are generally described as separate components, they may instead be formed as a unitary (single) component, as the case may be when a fixed connection is desired between the lower link 608 and the end-effector 610. Accordingly, one or more of the hip joint 612, knee joint 614, and the ankle joint 616 may employ pivotal joints (e.g., rotation about axes B, C, and/or D). The pivotal joints may be formed as a hinge with a pin, a clevis with a pin, etc.

One or more linear spring elements 618 (e.g., metal springs, elastic/rubber bands/strap, etc.) may be placed between the rigid bodies of the intermediate link 606 and the base 602 (or the upper link 604). In certain aspects, the end-effector's 610 rotating ankle joint 616 may be designed such that the force of gravity passively aligns the bottom of the end-effector 610 with the stable surface 216. In certain aspects, the passive lifting mechanism 600 may be configured with built-in compliance to enable the UAV 100 to be flown towards the stable surface 216. The compliance of the leg allows for some decoupling of the impact between the end-effector 610 and the stable surface 216, and the range of motion of the leg and ankle allow for contact to be maintained even if the UAV 100 is not exactly at a single vertical height or orientation. This compliance assists in stability of the UAV 100. For purposes of validation, experiments using the passive lifting mechanism 600 were performed without motion/compliance of the joints. Specifically, the rotational joints were made rigid by tightening the screws that were used as bearing surfaces. While some aerial manipulation was still possible, UAV 100 control was reduced and crashes were more common.

Figures 6A, 6B:
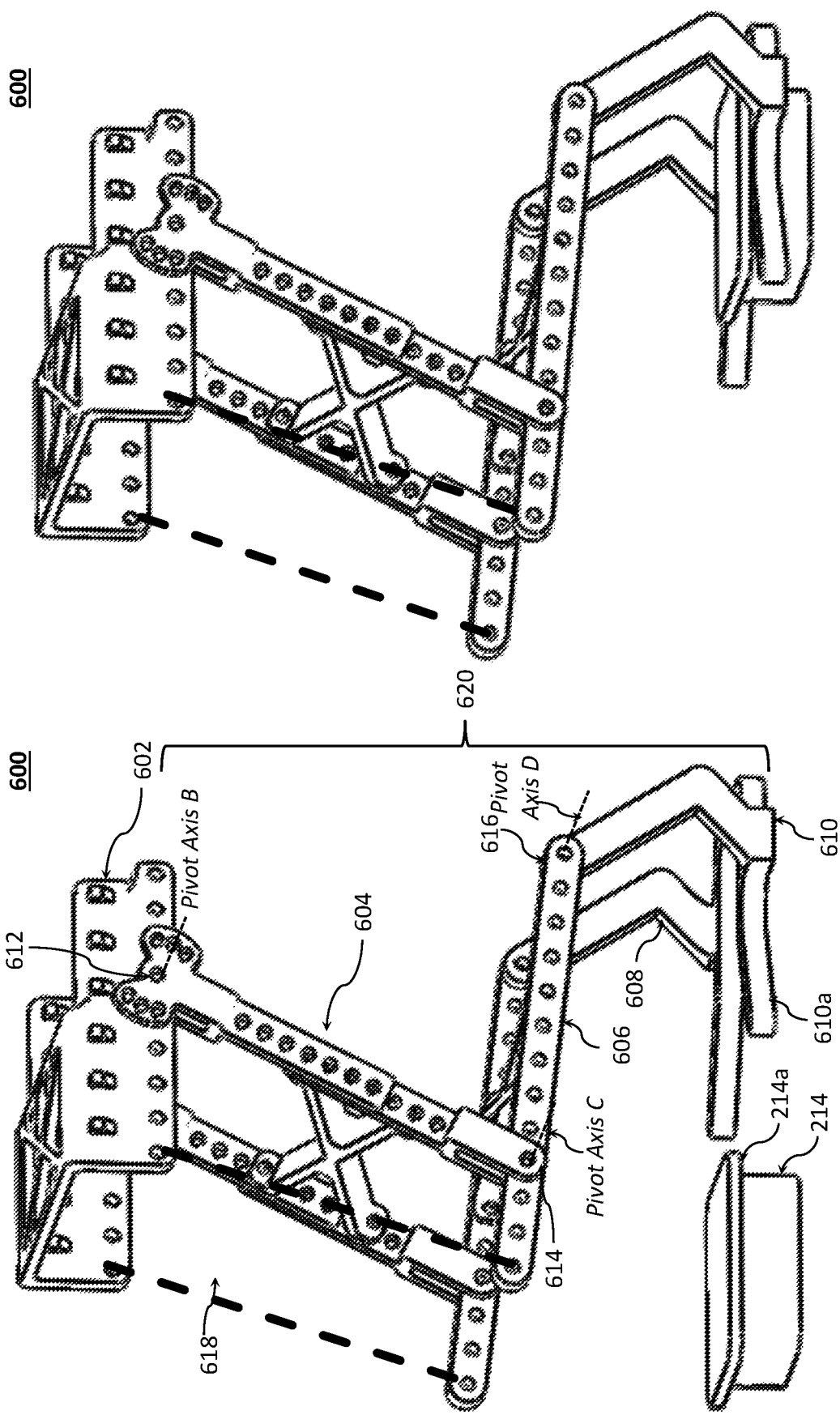
FIGS. 6a through 6d illustrate an example passive workpiece manipulation system for use with a UAV.
Figure 6C:
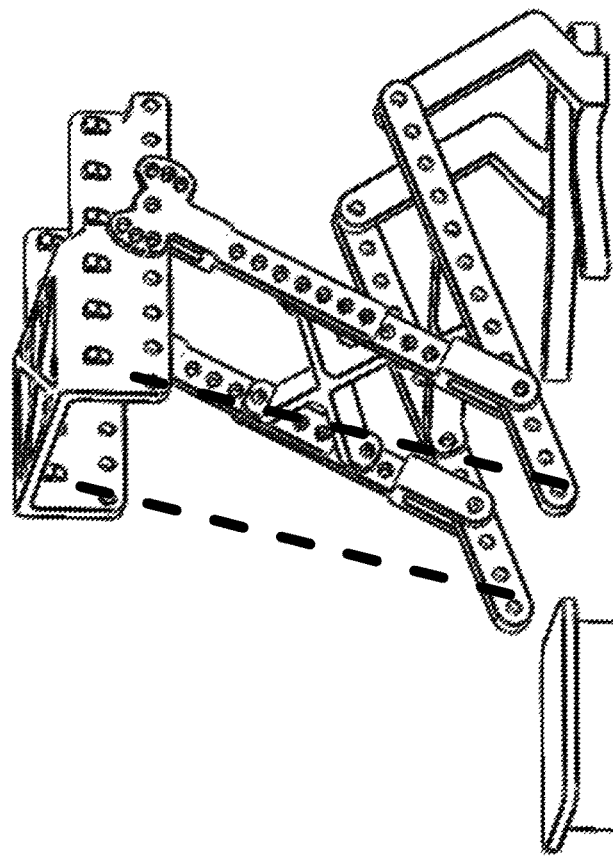
Figure 6D:
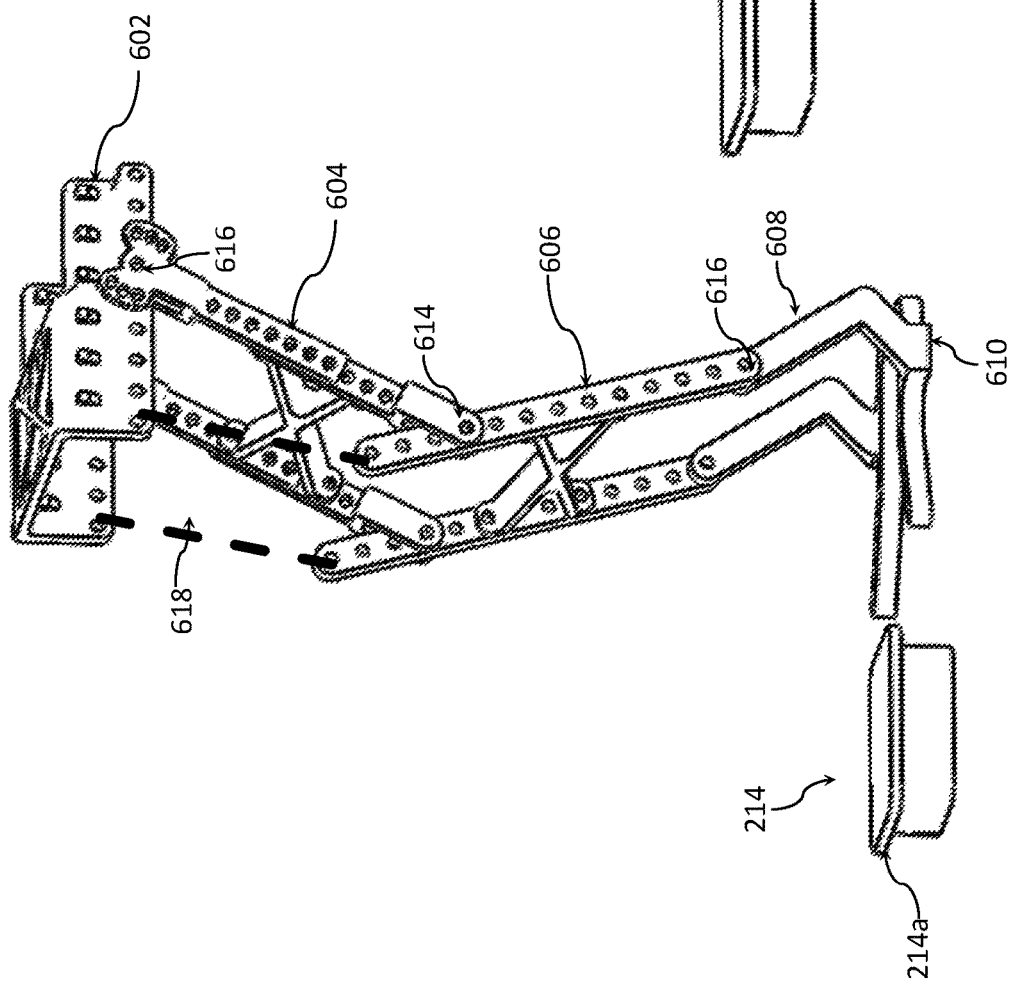

The control of the UAV 100 towards a desired workpiece 214 is simplified because it is easier to maintain contact of the end-effector 610 with a stable surface 216. Indeed, an entirely passive lifting mechanism 600 can enable manipulation where the end-effector 610 and workpiece 214 are designed to mate, as best illustrated in FIG. 6a. Specifically, the end-effector 610 is sized and shaped to the dimensions of the workpiece 214. Note that the end-effector 610 includes a funnel feature 610a at the front to guide the workpiece 214 into the end-effector 610, while the workpiece 214 includes a lip 214a on its top surface. The funnel feature 610a and lip 214a allow the end-effector 610 and workpiece 214 to align with one another as the end-effector 610 drives into the workpiece 214. Further, the workpiece's 214 lip 214a engages the end-effector 610, thereby allowing the end-effector 610 to lift the workpiece 214.

The passive lifting mechanism 600 may be attached to the UAV 100 such that the end-effector 610 aligns approximately with the center of mass of the UAV 100. However, testing has demonstrated that it is easier to "pull" (or "drag") the end-effector 610 (i.e., to place the end-effector 610 slightly "behind" the center of mass) and then drive the UAV 100 forward. This can be attributed to the torques applied by the UAV 100 onto itself when moving forward. That is, to move forward, the UAV 100 may pitch forward. Proper placement of the end-effector 610, therefore, does not fight this motion. Accordingly, while FIGS. 5a through 5c illustrate a pushing configuration (i.e., the end-effector 610 slightly forward of the center of mass), placement of the end-effector (whether a passive end-effector 610 or an active end-effector 210) may be moved aft to enable dragging/pulling configuration.

In operation, the UAV 100 is flown to the front of the workpiece 214. The UAV 100 is driven forward (toward the workpiece 214) while the end-effector 610 is dragged to interface with the workpiece 214. Compliance in the passive lifting mechanism 600 provides a suspension between the UAV 100 and stable surface 216 while the end-effector 610 is in contact with the stable surface 216. Rotational compliance in the end-effector 610 enables flat surface-contact between the end-effector 610 and the stable surface 216 without necessitating flawless alignment via the UAV 100. The hip joint 612 may be fixed, or configured to rotate. A spring element 618 attached between the knee joint 614 and the hip joint 612 provides compliance in the knee joint 614. The ankle joint 616 in free to rotate. The end-effector 610 is designed such that gravity pulls it to be parallel to the stable surface 216. The ankle joint 616 could align to an angled ground. Upon contact with the stable surface 216, the knee joint 614 may be configured to bend significantly. The specific limb geometry may be selected to enable the UAV 100 to travel a predetermined vertical distance above the stable surface 216 (e.g., 2 to 12 inches, 2 to 8 inches, or about 4 inches), while the end-effector 610 maintains contact with the stable surface 216. Once the workpiece 214 is captured (i.e., secured by the end-effector 610), the UAV 100 lifts off and flies away.

To provide around the clock operation (e.g., 24 hours a day, 7 days a week), the UAV 100 should be configured to provide continuous operation. A problem, however, is that UAVs 100 are limited by their battery capacity. Nevertheless, continuous operation may be facilitated in multiple ways, including a tag team approach, a battery swapping approach, and/or an overhead tether system.

In a tag team approach, multiple UAVs 100 may be deployed, where one UAV 100 operates while the remaining UAVs 100 recharge their batteries. As can be appreciated, the number of UAVs 100 needed in the tag team approach is a function of the operating time of the UAV 100 and the time needed to recharge the UAV 100. For example, if a UAV 100 can operate for 15 minutes before needing to recharge its batteries, and a recharge takes 75 minutes, six (6) UAVs 100 would be needed for continuous operation, each with its own charging station. The charging stations may be contact charging station or contactless charging stations (e.g., employing one or more inductive charging techniques). The tag team approach offers the advantage (with proper schedule management) of having several UAVs 100 simultaneously available to perform parallel tasks. However, the purchase cost of the overall system would be 6 times higher than for a single UAV 100 and operational and maintenance costs would increase. In a battery swapping approach, an operator (or robotic system) may be employed to: remove a spent battery pack from a UAV 100; replace it with a fresh battery pack; and place the spent battery pack in a charger. The battery swapping approach offers the advantage of obviating the need for several UAVs 100, but introduces the time expense for an operator to swap the battery packs and the complexity associated with a robotic battery-swapping system.

An overhead tether system would introduce a wire tether to enable continuous uninterrupted power to the UAV 100, and obviates the need for the battery, freeing up valuable lifting capacity and resulting in a much smaller UAV 100. A wire tether would also provide safer UAV 100 in the event of failure since the wire tether could be used to catch the UAV 100 if it veers off course or fails. However, a tether restricts the number of UAVs 100 that can operate in tandem or a swarm, and restricts each UAV's 100 movement. Where the UAVs 100 are operated with access to sunlight (or other equivalent light), one or more solar panels may be installed on the UAV 100 to extend battery life. Exemplary solar aircraft configurations and techniques are described by commonly owned U.S. Patent Publication Nos. 2017/0331323, which was filed May 12, 2017 and is titled "Solar Power System and Method Thereof," and 2016/0311545, which was filed Apr. 21, 2016 and is titled "Solar-Powered Aircraft."

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A aerial workpiece manipulation system to provide high-precision manipulation of a workpiece via an aircraft, the aerial workpiece manipulation system comprising:
 an airframe;
 a lifting mechanism coupled to the airframe, wherein the lifting mechanism includes one or more joint actuators to extend or retract the lifting mechanism relative to the airframe;
 an end-effector coupled to the lifting mechanism, wherein the end-effector includes an end-effector actuator to control an operation of the end-effector to manipulate the workpiece; and
 a processor communicatively coupled with the aircraft and configured to control operation of the end-effector actuator and the one or more joint actuators,
  wherein the processor is configured to control the end-effector actuator or the one or more joint actuators to maintain contact between the end-effector and a stable surface as the aircraft moves toward the workpiece.

2. The aerial workpiece manipulation system of claim 1, wherein the lifting mechanism is a four-bar linkage having four linkage bars connected in a loop by four linkage joints.

3. The aerial workpiece manipulation system of claim 2, wherein the lifting mechanism is coupled to the airframe at a first linkage joint via a mounting structure, and wherein the one or more joint actuators are configured to pivot at least one of the four linkage bars about an axis of rotation of the first linkage joint.

4. The aerial workpiece manipulation system of claim 3, wherein the one or more joint actuators include a first joint actuator and a second joint actuator, wherein the first joint actuator is configured to pivot one of the four linkage bars about the axis of rotation and the second joint actuator is configured to pivot a different one of the four linkage bars about the axis of rotation.

5. The aerial workpiece manipulation system of claim 1, wherein the end-effector comprises one or more feedback sensors to provide feedback data to the processor.

6. The aerial workpiece manipulation system of claim 1, wherein the end-effector comprises an optical module that is communicatively coupled with the processor.

7. The aerial workpiece manipulation system of claim 1, wherein the end-effector comprises a pressure sensor that is communicatively coupled with the processor.

8. The aerial workpiece manipulation system of claim 7, wherein the pressure sensor is embedded in cast rubber.

9. The aerial workpiece manipulation system of claim 7, wherein the pressure sensor is positioned on an underside surface of the end-effector.

10. A workpiece manipulation system for use in an aircraft to provide high-precision manipulation of a workpiece, the workpiece manipulation system comprising:
a lifting mechanism to couple with the aircraft, wherein the lifting mechanism includes one or more joint actuators to extend or retract the lifting mechanism relative to the aircraft;
an end-effector coupled to the lifting mechanism, wherein the end-effector includes an end-effector actuator to control an operation of the end-effector to manipulate the workpiece; and
a processor communicatively coupled with the aircraft and configured to control operation of the end-effector actuator and the one or more joint actuators to maintain contact between the end-effector and a stable surface as the aircraft moves toward the workpiece.

11. The workpiece manipulation system of claim 10, wherein the lifting mechanism is a four-bar linkage having four linkage bars connected in a loop by four linkage joints.

12. The workpiece manipulation system of claim 11, wherein the lifting mechanism is configured to couple with the aircraft at a first linkage joint via a mounting structure.

13. The workpiece manipulation system of claim 12, wherein the one or more joint actuators are configured to pivot at least one of the four linkage bars about an axis of rotation of the first linkage joint.

14. The workpiece manipulation system of claim 12, wherein the one or more joint actuators include a first joint actuator and a second joint actuator, wherein the first joint actuator is configured to pivot one of the four linkage bars about the axis of rotation of the first linkage joint and the second joint actuator is configured to pivot a different one of the four linkage bars about the axis of rotation.

15. The workpiece manipulation system of claim 10, wherein the lifting mechanism is configured to removably couple to the aircraft via a mounting structure.

16. The workpiece manipulation system of claim 10, wherein the end-effector comprises an optical module that is communicatively coupled with the processor.

17. The workpiece manipulation system of claim 16, wherein the optical module includes a first infrared (IR) camera, an IR laser projector, and a second IR camera that is spaced apart from the first IR camera.

18. The workpiece manipulation system of claim 10, wherein the end-effector comprises a pressure sensor that is communicatively coupled with the processor.

19. A workpiece manipulation system for use in an aircraft to provide high-precision manipulation of a workpiece, the workpiece manipulation system comprising:
an end-effector shaped to guide the workpiece toward the end-effector; and
a lifting mechanism to couple with the aircraft,
wherein the lifting mechanism comprises a set of jointed legs, each of said jointed legs comprising a first link pivotally coupled a second link,
wherein the end-effector is coupled to each of the jointed legs,
wherein the lifting mechanism is configured to passively extend or retract relative to the aircraft upon the end-effector contacting a stable surface,
wherein a linear spring element couples a portion of the first link with a portion of the second link, and
wherein the lifting mechanism is configured to maintain contact between the end-effector and the stable surface to orient and stabilize the end-effector in three degrees of freedom.

20. The workpiece manipulation system of claim 19, wherein each of the jointed legs is configured to move independently to allow for the aircraft to move from side-to-side while maintaining contact between the end-effector and the stable surface.

* * * * *